(12) United States Patent
Iijima

(10) Patent No.: US 7,161,647 B2
(45) Date of Patent: Jan. 9, 2007

(54) LIQUID CRYSTAL DISPLAY DEVICE AND ELECTRONIC DEVICE

(75) Inventor: Chiyoaki Iijima, Ina (JP)

(73) Assignee: Seiko Epson Corporation, Tokyo (JP)

( * ) Notice: Subject to any disclaimer, the term of this patent is extended or adjusted under 35 U.S.C. 154(b) by 269 days.

(21) Appl. No.: 10/700,638

(22) Filed: Nov. 5, 2003

(65) Prior Publication Data
US 2004/0141119 A1 Jul. 22, 2004

(30) Foreign Application Priority Data
Nov. 22, 2002 (JP) .......................... 2002-339298
Nov. 22, 2002 (JP) .......................... 2002-339300
Jul. 25, 2003 (JP) .......................... 2003-280076

(51) Int. Cl.
*G02F 1/1335* (2006.01)

(52) U.S. Cl. .................. 349/113; 349/114; 349/119; 349/179; 349/180; 349/181; 349/112

(58) Field of Classification Search ............... 349/112, 349/113, 114, 119, 179, 180, 181, 96
See application file for complete search history.

(56) References Cited

U.S. PATENT DOCUMENTS

| 5,841,496 A | 11/1998 | Itoh et al. | |
|---|---|---|---|
| 6,008,871 A | 12/1999 | Okumura | |
| 6,097,458 A | 8/2000 | Tsuda et al. | |
| 6,738,115 B1 * | 5/2004 | Iijima | 349/113 |
| 6,816,217 B1 * | 11/2004 | Sone | 349/114 |
| 6,825,902 B1 * | 11/2004 | Kaneko | 349/114 |

FOREIGN PATENT DOCUMENTS

| JP | A-7-318929 | 12/1995 |
|---|---|---|
| JP | A-8-271884 | 10/1996 |
| JP | A-9-101517 | 4/1997 |
| JP | A-10-177106 | 6/1998 |
| JP | A-10-260402 | 9/1998 |
| JP | A-10-319390 | 12/1998 |
| JP | A 10-332914 | 12/1998 |
| JP | A-2000-180607 | 6/2000 |
| JP | A-2000-284266 | 10/2000 |
| JP | A-2001-124906 | 5/2001 |
| JP | A-2000-172925 | 6/2003 |
| WO | WO 01/31391 A1 | 5/2001 |

* cited by examiner

*Primary Examiner*—Toan Ton
*Assistant Examiner*—Tai Duong
(74) *Attorney, Agent, or Firm*—Oliff & Berridge, PLC

(57) ABSTRACT

The invention provides a transflective liquid crystal display device which provides both high-contrast, bright reflective and transmissive displays. The liquid crystal display device of the present invention can include a liquid crystal panel and a backlight. The liquid crystal panel includes a liquid crystal layer, which is disposed between an upper substrate and a lower substrate and whose liquid crystals are disposed in a twisted manner at an angle in the range of from 220 to 270 degrees, an upper retardation film and a lower retardation film, which are disposed above and below the liquid crystal layer so as to sandwich it; an upper polarizer 16 and a lower polarizer, which are disposed on the outer surfaces of their respective retardation films, and a sloping reflective layer. Light impinging upon the upper polarizer from the liquid crystal layer is elliptically polarized light. The product of an optical anisotropy Δn of the liquid crystal layer and thickness d of the liquid crystal layer, Δnd, lies in the range of from 820 nm to 950 nm. Light obliquely impinging upon the liquid crystal panel exits in a direction that is closer to a direction perpendicular to the liquid crystal panel than to a specular reflection direction.

10 Claims, 10 Drawing Sheets

LIQUID CRYSTAL DISPLAY DEVICE AND ELECTRONIC DEVICE

BACKGROUND OF THE INVENTION

1. Technical Field of Invention

The present invention relates to a liquid crystal display device and an electronic device.

2. Description of Related Art

A transflective liquid crystal display device is a type of liquid crystal display device which makes use of outside light in a bright place like an ordinary reflective liquid crystal display device, and which makes a display visible by an internal light source in a dark place. This type of liquid crystal display device is disclosed in, for example, Japanese Unexamined Patent Application Publication No. 10-332914. FIG. 10 illustrates the general structure of and display principles of the transflective liquid crystal display device.

In FIG. 10, a liquid crystal display device 100 can include a liquid crystal panel 110 and a backlight 120. In the liquid crystal panel 100 an upper polarizer 116, a first upper retardation film 135, a second upper retardation film 115, an upper substrate 111, a liquid crystal layer 113, a reflective layer 114, a lower substrate 112, a ¼ wavelength plate 117, and a lower polarizer 118 are disposed in that order from the display surface side (illustrated top surface side). A reflective plate 122 is disposed at the outer surface of a light guide plate 121 of the backlight 120.

SUMMARY OF THE INVENTION

In the liquid crystal display device 100 shown in FIG. 10, in order to obtain a bright reflective display with high contrast, the directions of the polarization axes of the upper polarizer 116 and the lower polarizer 118, the optical anisotropy of the liquid crystal layer 113, etc., are set as illustrated in FIG. 10. In this case, when the reflective display is dark, light which has passed through the liquid crystal layer 113 and reached the reflective layer 114 is circularly polarized light. When the circularly polarized light is reflected and impinges upon the upper polarizer 116, it is converted into linearly polarized light that is perpendicular to the polarization axis of the upper polarizer 116. On the other hand, when the reflective display is bright, light which is reflected by the reflective layer 114 is linearly polarized light. After being reflected, the reflected light is linearly polarized light when it is incident upon the upper polarizer 116.

In contrast, in transmissive display for transmitting light from the backlight 120 through an opening 114a that is formed in the reflective layer 114, when the display is dark, in order to cause light incident upon the upper polarizer 116 to be absorbed by the upper polarizer 116, it is necessary for the backlight light incident upon the liquid crystal layer 113 be circularly polarized light. However, when the transmissive display is bright, light incident upon the upper polarizer 116 from the liquid crystal layer 113 is circularly polarized light, so that about half of the light is absorbed by the upper polarizer 116. As a result, the transmissive display cannot have sufficient luminance and contrast.

A liquid crystal display device used as a display device in an electronic device is required to be reliable so as to withstand the environment of use of the electronic device in which it is installed. In particular, the liquid crystal display device is required to stably provide a high-quality display regardless of the environment. In the liquid crystal display device, the display luminance and contrast often vary as a result of changes in birefringence of the liquid crystal layer due to temperature, so that the contrast is low particularly in a high-temperature environment.

The present invention has been achieved to overcome the aforementioned problem, and has as its object the provision of a transflective liquid crystal display device which provides both a reflective display and a transmissive display which are bright and have high contrast. More desirably, the present invention has as its object the provision of a transflective liquid crystal display device whose display quality is not easily reduced due to temperature changes.

First, in order to solve the problem of insufficient brightness of a transmissive display in the transflective liquid crystal display device, the present invention provides a liquid crystal display device having the structure shown in FIG. 8. The liquid crystal display device shown in FIG. 8, which is made up of the same parts as those used in the related liquid crystal display device shown in FIG. 10, differs from the related liquid crystal display device in that the optical anisotropy of a liquid crystal layer 113 and the optical anisotropy of an upper retardation film 115 are different from those used in the related example, so that, in the transmissive display, the polarization state of light that is incident upon an upper polarizer 116 from the liquid crystal layer 113 is that of an elliptically polarized light. By virtue of such a structure, when the transmissive display is bright, it is possible to increase the quantity of light passing through the upper polarizer 116, so that a bright transmissive display can be provided.

However, in the liquid crystal display device shown in FIG. 8, when the optical anisotropy of the liquid crystal layer 113 is changed, in a reflective display in a dark state, light which is incident upon the upper polarizer 116 from the liquid crystal layer 113 is not linearly polarized light that is parallel to the absorption axis of the upper polarizer 116, so that the light is an elliptically polarized light causing light to leak, thereby slightly reducing the contrast of the reflective display.

In addition, measurements of voltage characteristics in terms of the transmittance ratio and reflectance ratio of a liquid crystal panel show that good voltage characteristics are obtained in the transmissive display whose graph is shown in FIG. 9A, whereas, in the reflective display whose graph is shown in FIG. 9B, a reflectance ratio peak occurs within the same voltage range as in the transmissive display. In other words, when a voltage applied to the liquid crystal layer 113 is determined so that the luminance of the transmissive display becomes a maximum, a tone reversal occurs in the reflective display.

Therefore, although the liquid crystal display device shown in FIG. 8 may be suitably used in applications where a fixed display is only turned on and off and grayshade is not required because in such a case both a transmissive display and a reflective display with sufficient luminance are provided, it is not suitable for use as a display device that requires grayshade, such as, in a computer, a cellular phone, or a hand-held terminal.

When the liquid crystal display device is viewed from the front side, contrast is reduced in the reflective display, whereas, when the liquid crystal display device is viewed from a small viewing angle, a display which does not have tone reversal and which has a higher luminance than when it is viewed from the front side can be provided. From this, if the viewing angle at which this good reflective display is obtained is set in the direction of the front surface of the panel, both a good reflective display and a good transmissive display can be provided. Based on this thought, a liquid crystal display device of the present invention having the following structure is provided as technique for solving the aforementioned problem.

To overcome the problem, the liquid crystal display device of the present invention can include a transflective liquid crystal panel and an illuminating device disposed on the back surface of the liquid crystal panel. The transflective liquid crystal panel can include opposing upper and lower substrates, a liquid crystal layer sandwiched between the substrates and having liquid crystal molecules disposed in a twisted manner at an angle in the range of from 220 to 270 degrees, an upper retardation film and a lower retardation film sandwiching the liquid crystal layer from above and below the liquid crystal layer, an upper polarizer and a lower polarizer disposed on the outer surface of the upper retardation film and the outer surface of the lower retardation film, respectively, and a transflective layer, which is disposed on the inner side of the lower substrate, for reflecting and transmitting a portion of light incident upon the liquid crystal panel. In a bright display, light emitted from the illuminating device and incident upon the upper polarizer from the liquid crystal layer is elliptically polarized light, and the product of an optical anisotropy Δn and a thickness d of the liquid crystal layer, Δn·d, is in the range of from 820 nm to 950 nm. The liquid crystal panel has a directional reflection function which causes light obliquely incident upon the liquid crystal panel to exit mainly in a direction perpendicular to the liquid crystal panel rather than in a specular reflection direction.

In a bright display, the liquid crystal display device having the above-described structure provides a transmissive display that is brighter than that of the related liquid crystal display device shown in FIG. 10 by causing the light incident upon the upper polarizer from the liquid crystal layer to be elliptically polarized light, and makes it possible to prevent a reduction in contrast and tone reversal in the reflective display by providing the directional reflection function. The term bright display refers to the brighter display state when the liquid crystal layer is in an on state or an off state.

Next, since the amount of change in the birefringence of the liquid crystal layer (liquid crystals) 113 caused by a temperature rise and the amount of change in the birefringence of the first upper retardation film 135, which is disposed as an optical compensator at the display surface of the panel for the purpose of compensating for coloring of the background color of the liquid crystal display device and increasing the viewing angle, are different, the retardation film 135 does not function optically, so that a reduction in the display quality caused by environmental temperature occurs due to, for example, coloring of the background color, a reduction in the viewing angle, and a reduction in contrast. In other words, an ordinary polymeric film that is stretched is used as the first retardation film 135. Since, in this type of stretch film, the optical anisotropy Δn is virtually unchanged with respect to temperature changes, a difference in optical anisotropy occurs between the first retardation film 135 and the liquid crystals whose optical anisotropy Δn changes comparatively greatly with changes in temperature. Therefore, the reduction in the display quality occurs because optical compensation is not effectively performed on the light transmitted through the liquid crystal layer.

To overcome this problem, the inventor thought that, if a retardation film whose optical anisotropy Δn changes with temperature and whose rate of change in the optical anisotropy Δn is suitably controlled is used instead of the first retardation film 135, it is possible to effectively prevent a reduction in display quality caused by changes in the environmental temperature.

The present invention has been achieved based on this knowledge, and provides the following structures for overcoming this problem.

To overcome the above-described problem, the liquid crystal display device of the present invention can include a transflective liquid crystal panel and an illuminating device disposed on the back surface of the liquid crystal panel. The transflective liquid crystal panel includes opposing upper and lower substrates, a liquid crystal layer sandwiched between the substrates and having liquid crystal molecules disposed in a twisted manner at an angle in the range of from 220 to 270 degrees, an upper retardation film and a lower retardation film sandwiching the liquid crystal layer from above and below the liquid crystal layer, an upper polarizer and a lower polarizer disposed on the outer surface of the upper retardation film and the outer surface of the lower retardation film, respectively, and a transflective layer, which is disposed on the inner side of the lower substrate, for reflecting and transmitting a portion of light incident upon the liquid crystal panel. In a pixel in a bright display of the liquid crystal panel, light emitted from the illuminating device, exiting from the liquid crystal layer side, and incident upon the upper polarizer is elliptically polarized light, and the product of an optical anisotropy Δn and a thickness d of the liquid crystal layer, Δn·d, is in the range of from 820 nm to 950 nm. The liquid crystal panel has a directional reflection function which causes light obliquely incident upon the liquid crystal panel to exit in a direction perpendicular to the liquid crystal panel rather than in a specular reflection direction. A ratio R70/R25 is set within a range of Condition (1) using an N-I point, which is represented by Tni (in °C.) in Condition (1), of the liquid crystals of the liquid crystal layer:

$$\left(\frac{T_{ni}-80}{T_{ni}-20}\right)^{0.22} < \frac{R70}{R25} < \left(\frac{T_{ni}-30}{T_{ni}-20}\right)^{0.22} \quad (1)$$

where R70 is the product of an optical anisotropy Δn and a thickness d of the upper retardation film, Δn·d, at 70°C., and R25 is that at 25°C.

The liquid crystal display device of the present invention having the above-described structure can provide a transmissive display that is brighter than that of the related liquid crystal display device shown in FIG. 10 by causing the light incident upon the upper polarizer from the liquid crystal layer to be elliptically polarized light at pixels in a bright display, and makes it possible to effectively prevent a reduction in contrast and tone reversal in a reflective display, which are problems in the liquid crystal display device having the structure shown in FIG. 8, by providing the directional reflection function. The term bright display refers to the brighter display state when pixel liquid crystals are in an on state or an off state.

When a retardation film whose phase difference (Δn·d) changes with temperature and whose rate of change (R70/R25) in the Δn·d value is within the aforementioned range is used as the upper retardation film disposed above the liquid crystal layer, it is possible to effectively prevent a reduction in display quality caused by temperature changes in the liquid crystal display device having the structure of the present invention. In other words, when the retardation film whose rate of change of the Δn·d value is within the aforementioned range is used along with a liquid crystal panel in which light impinging upon an upper polarizer from a liquid crystal layer is elliptically polarized light and which has a directional reflection function, which is a necessary structure of the present invention, a particularly marked effect is achieved.

An N-I point of the liquid crystals is what is called a liquid crystal clear point, and refers to an N-I (nematic-isotropic liquid) transition temperature. It has been verified that the range indicated by Condition (1) above is a proper range, and the details thereof will be mentioned in the description of embodiments.

In the liquid crystal display device of the present invention, it is desirable that the ratio R70/R25 be set within a range of Condition (2) using the N-I point, which is represented by Tni (in ° C.) in Condition (2), of the liquid crystals of the liquid crystal layer:

$$\left(\frac{T_{ni}-75}{T_{ni}-20}\right)^{0.22} < \frac{R70}{R25} < \left(\frac{T_{ni}-40}{T_{ni}-20}\right)^{0.22} \quad (2)$$

where R70 is the product of the optical anisotropy Δn and the thickness d of the upper retardation film, Δn·d, at 70° C., and R25 is that at 25° C.

When the value R70/R25, which is the rate of change of the Δn·d value of the upper retardation film with temperature, is within the aforementioned range, even if the optical anisotropy Δn of the liquid crystals changes due to temperature changes, it is possible to provide a liquid crystal display device which provides a high-contrast display because it makes it possible to effectively prevent coloring of the background color and increase viewing angle.

In the liquid crystal display device of the present invention, it is desirable that, in the pixel in the bright display of the liquid crystal panel, ellipticity of the elliptically polarized light which impinges upon the upper polarizer from the liquid crystal layer be greater than 0 and equal to or less than 0.5 at 25° C. By virtue of such a structure, it is possible to increase the quantity of light which passes through the upper polarizer and which is used for transmissive display, so that a bright transmissive display is provided.

Here, the ellipticity of elliptically polarized light having a major axis with a length A and a minor axis with a length B is defined as B/A. In the specification, the ellipticity is equal to the B/A value at a wavelength of 550 nm. In the actual measurement, it is possible to determine the ellipticity B/A from a ratio of a maximum value $T_{max}$ and a minimum value $T_{min}$, that is, $\sqrt{(T_{min}/T_{max})}$, of the transmittance ratio of measured inspection light, by changing the direction of the polarization axis of a liquid crystal display device having a polarization analyzer instead of the upper polarizer 116.

In the liquid crystal display device of the present invention, the liquid crystal panel may comprise a sloping reflective layer. By virtue of such a structure, it is possible to achieve the directional reflection function by the sloping reflective layer. The sloping reflective layer has the function of reflecting light incident upon the layer in a direction that is different from a specular reflection direction. In other words, when outside light that is obliquely incident upon the liquid crystal panel is reflected by the sloping reflective layer, the direction of travel of the reflected light can be brought close to a direction perpendicular to the liquid crystal panel than to the specular reflection direction, so that the quantity of light exiting in the direction of a viewer who is positioned at the front side of the liquid crystal panel is increased, so that an essentially bright display can be provided.

In the liquid crystal display device of the present invention, the liquid crystal panel may include an off-axis anisotropic light scattering layer. The off-axis anisotropic light scattering layer scatters light and transmits light incident thereupon at a predetermined angle by changing the angle of the axis of the light to an angle that is different from the incident angle. When the off-axis anisotropic light scattering layer is disposed closer to the liquid crystal layer than the reflective layer, light reflected by the reflective layer can mainly exit in a direction perpendicular to the liquid crystal panel than obliquely to the panel, which is its specular reflection direction.

In the liquid crystal display device of the present invention, the liquid crystal panel may have a front-transmission, rear-diffraction layer. The front-transmission, rear-diffraction layer transmits light that is incident thereupon from one of the surfaces (front surface), and diffracts and transmits light that is incident thereupon from the other surface (rear surface). By disposing the front-transmission, rear-diffraction layer closer to the liquid crystal layer than the reflective layer, it is possible to diffract light reflected by the reflective layer and cause it to exit in a direction perpendicular to the liquid crystal panel.

In the liquid crystal display device of the present invention, the transflective layer may be a reflective layer that is formed partly within a dot area of the liquid crystal panel.

In the liquid crystal display device of the present invention, the transflective layer may be a layer that partly reflects and transmits a particular polarized component of incident light or a component of the incident light having a wavelength which lies in a particular wavelength region.

The liquid crystal display device can provide good reflective and transmissive displays when it is formed with any of the above-described structures.

An electronic device of the present invention comprises any one of the above-described liquid crystal display devices of the present invention. By virtue of these structures, it is possible to provide an electronic device comprising a display section which provides a transmissive display and a reflective display with high luminance, a high contrast over a wide temperature range, and a wide viewing angle.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Hereunder, a description of embodiments of the present invention will be given with reference to the drawings.

Figure 1:
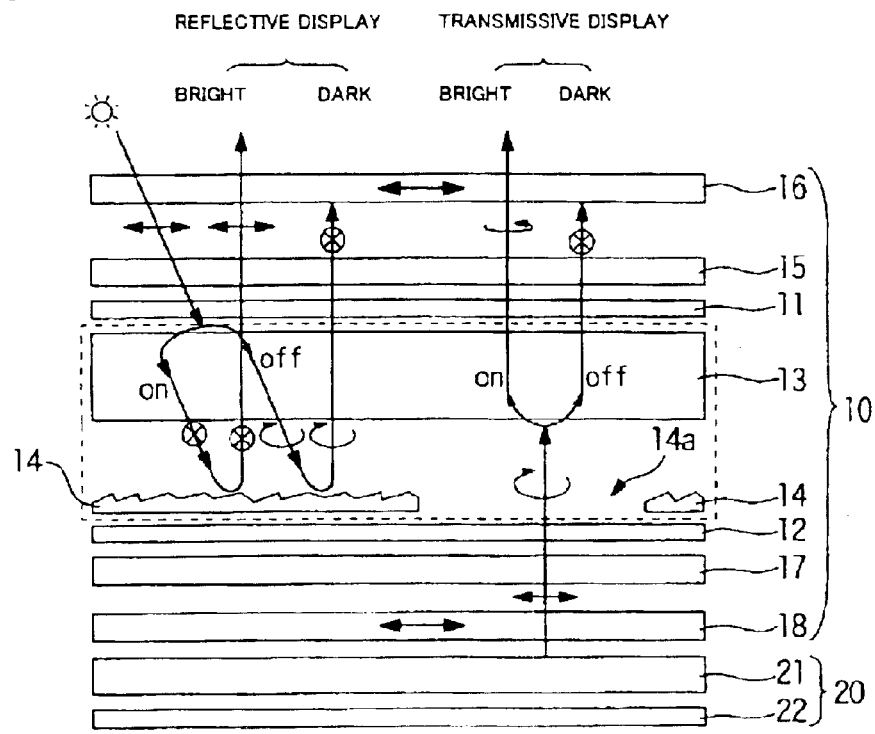
FIG. 1 illustrates the structure of a liquid crystal display device of a first embodiment of the present invention in cross section and display principles thereof.

FIG. 1 illustrates the structure of a liquid crystal display device of a first embodiment of the present invention in cross section and display principles thereof. The liquid crystal display device shown in FIG. 1 is a transflective liquid crystal display device that can include a liquid crystal panel 10 and a backlight (illuminating device) 20, disposed at the back side (bottom side in FIG. 1) of the liquid crystal panel 10.

In the liquid crystal panel 10, a liquid crystal layer 13 is sandwiched between opposing upper and lower substrates 11 and 12, an upper retardation film (upper retardation layer) 15 and an upper polarizer 16 are stacked in that order upon the outer surface of the upper substrate 11, and a lower retardation film (lower retardation layer) 17 and a lower polarizer 18 are stacked upon the outer surface of the lower substrate 12. At the liquid-crystal-layer-13 side of the lower substrate 12, a sloping reflective layer 14 is formed partly within a dot area, and functions as a transflective layer. At the liquid-crystal-layer-13 side of the upper substrate 11 and the lower substrate 12, although not shown, electrodes and alignment layers for controlling the alignment state of the liquid crystal layer 13 are formed. In some cases, a coloring layer for a color display may be provided.

As shown in FIG. 1, the sloping reflective layer 14 is formed partly within a dot area of the liquid crystal panel 10. Light from the backlight 20 is transmitted through a transmission area 14a where the sloping reflective layer 14 is not formed in order to perform transmissive display.

The backlight 20 can include a light guide plate 21, a reflective plate 22, disposed at the outer surface of the light guide plate 21, and a light source (not shown), disposed at an end surface of the light guide plate 21.

The liquid crystal layer 13 of the liquid crystal panel used in the present invention can have STN (super twisted nematic) liquid crystals whose molecules are oriented in a twisted manner at an angle in the range of from 220 to 270 degrees. The product of an optical anisotropy Δn of the liquid crystals and thickness d of the liquid crystal layer 13, that is, Δn·d, lies within the range of from 820 nm to 950 nm. If the Δn d value falls outside the aforementioned range and becomes less than 820 nm, improvement in the transmittance ratio cannot be expected, whereas if it becomes greater than 950 nm, tone reversal when light is reflected cannot be overcome.

Figure 11A:
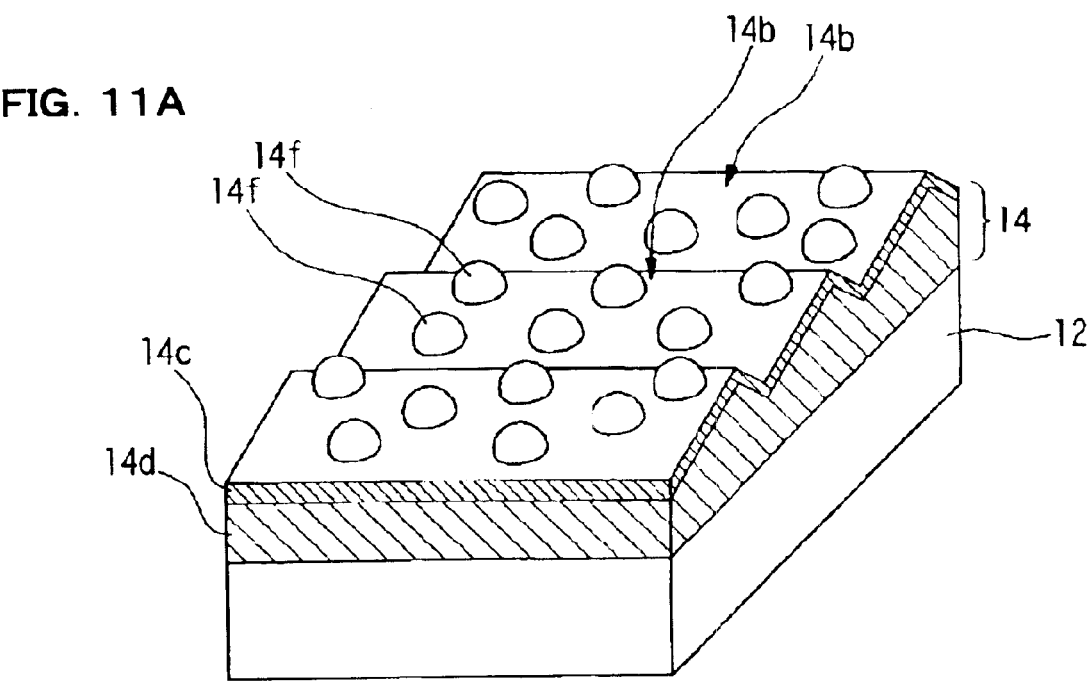
FIGS. 11A and 11B are partial perspective views of examples of a sloping reflective layer 14 shown in FIG. 1.
Figure 11B:
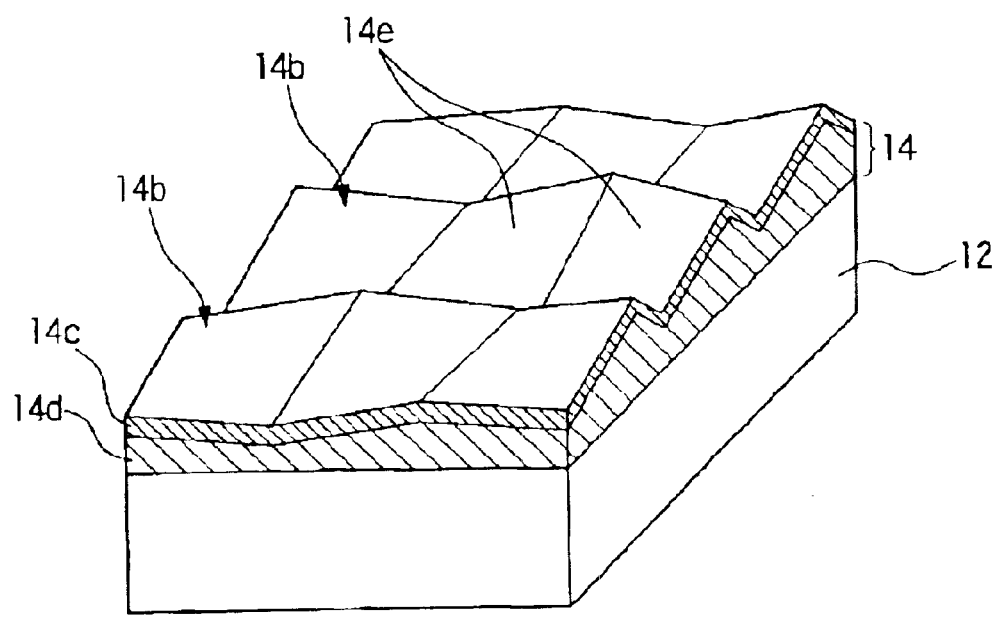

The sloping reflective layer 14 shown in FIG. 1 can be a reflective layer having the function of causing incident light to exit in a direction that is different from the specular reflection direction, and provides the directional reflection function in the liquid crystal display device of the embodiment. For example, as shown in FIG. 11A, the sloping reflective layer 14 may include a bumpy resinous film 14d having disposed thereat a plurality of triangular prismatic protrusions 14b with ridge lines that extend in the same direction, having a bumpy form defined by two inclined surfaces of protrusions 14b with different inclination angles, and having fine bumps 14f disposed on the surface of the inclined surfaces, and a reflective film 14c formed on the surface of the bumpy resinous film 14d. Alternatively, as shown in FIG. 11B, the sloping reflective layer 14 may comprise a bumpy resinous film 14d having disposed thereat a plurality of triangular prismatic protrusions 14b, which have ridge lines that extend in the same direction and which slope in the direction of a plane, and having a bumpy form defined by a plurality of inclined surfaces 14e, which form part of a side surfaces thereof and which have substantially randomly different inclination angles, and a reflective film 14c formed on the surface of the bumpy resinous film 14d.

In the embodiment, the reflection characteristics of the sloping reflective layer 14 are determined by the main inclination angle between the inclined surfaces of the triangular prismatic protrusions 14b so that light obliquely incident upon the liquid crystal panel 10 from above it and reflected by the sloping reflective layer 14 exits in a direction perpendicular to the liquid crystal panel 10. In FIG. 11A, the scattering effect of the reflected light is achieved by, for example, differences in shape and density of the fine bumpy portions 14f, whereas, in FIG. 11B, it is achieved by differences in the inclination of the fine inclined surfaces 14e. The top portions of the triangular prismatic protrusions 14b shown in FIGS. 11A and 11B may be rounded. Alternatively, a thin metallic film disclosed in Japanese Unexamined Patent Application Publication No. 10-177106 may be used.

Next, the principles of display of the liquid crystal display device of the embodiment having the above-described structure will be described.

First, in a reflective display shown at the left in FIG. 1, light that has obliquely impinged upon the liquid crystal panel 10 from above it is converted into linearly polarized light that is parallel to the plane of FIG. 1 by the upper polarizer 16 having a polarization axis that is parallel to the plane of FIG. 1. The linearly polarized light is transmitted through the upper retardation film 15 and impinges upon the liquid crystal layer 13. Then, when the liquid crystal layer 13 is in an on state (that is, in a state in which voltage is applied to the liquid crystals and the liquid crystal molecules are aligned along the electric field), as shown in FIG. 1, the light is converted into linearly polarized light that is substantially perpendicular to the plane of FIG. 1 by polarization conversion action of the upper retardation film 15 and the liquid crystal layer 13. The converted light impinges upon the sloping reflective layer 14, and is reflected in the direction perpendicular to the liquid crystal panel 10 by the action of the sloping reflective layer 14. The reflected light is converted into linearly polarized light that is parallel to the plane of FIG. 1 by the liquid crystal layer 13 and then the upper retardation plate 15. The converted light impinges upon the upper polarizer 16, and exits therefrom in the direction perpendicular to the liquid crystal panel 10, so that a bright dot is displayed.

On the other hand, when the liquid crystal layer 13 is in an off state (that is, the orientation state of the liquid crystal molecules is the same as that when voltage is not applied), light that has impinged upon the upper retardation film 15 becomes a counterclockwise virtually circularly polarized light by the upper retardation film 15 and the liquid crystal layer 13. The counterclockwise virtually circularly polarized light reaches the sloping reflective layer 14, and is reflected in the direction perpendicular to the liquid crystal panel 10 by the action of the sloping reflective layer 14, and is converted into a clockwise virtually circularly polarized light. Then, after the light has passed through the liquid crystal layer 13, the light is converted into linearly polarized light that is perpendicular to the plane of FIG. 1 by the upper retardation film 15, and the converted light is absorbed by the upper polarizer 16 having a polarization axis parallel to the plane of FIG. 1, so that a dark dot is displayed.

Next, in transmissive display, light emitted from the backlight 20 is converted into linearly polarized light parallel to the plane of FIG. 1 by the lower polarizer 18, and is, then, converted into clockwise circularly polarized light by the lower retardation film 17. The converted light impinges upon the liquid crystal layer 13 through the transmission area 14a where the sloping reflective layer 14 is not formed. When the liquid crystal layer 13 is in an on state, the light is converted into elliptically polarized light having a major axis substantially parallel to the polarization axis of the upper polarizer 16 by polarization conversion action of the liquid crystal layer 13 and the upper retardation film 15, and the converted light is incident upon the upper polarizer 16. A component of the light that is parallel to the polarization axis of the upper polarizer 16 is only transmitted through the upper polarizer 16, so that a bright dot is displayed.

On the other hand, when the liquid crystal layer 13 is in an off state, the clockwise circularly polarized light is transmitted through the liquid crystal layer 13, and is converted into linearly polarized light perpendicular to the plane of FIG. 1 by the upper retardation film 15, and the converted light is incident upon the upper polarizer 16. Then, the light is absorbed by the upper polarizer 16 having a polarization axis parallel to the plane of FIG. 1, so that a dark dot is displayed.

Figure 10:
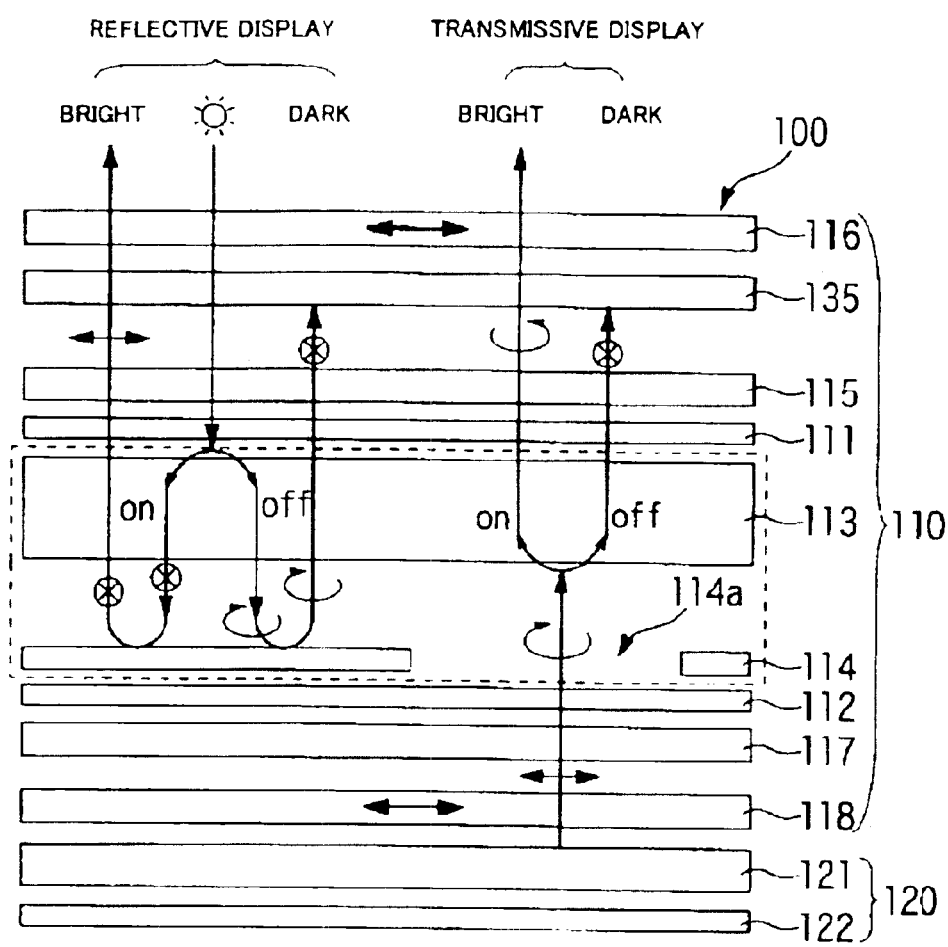
FIG. 10 illustrates the structure of a related transflective liquid crystal display device in cross section and display principles thereof.

In the liquid crystal display device of the embodiment for performing a reflective display and a transmissive display based on the above-described display principles, as shown in FIG. 1, in the transmissive display, the light incident upon the upper polarizer 16 from the liquid crystal layer 13 is elliptically polarized light, so that, compared to the related liquid crystal display device 100 shown in FIG. 10, it is possible to increase the quantity of light passing through the upper polarizer 16, so that a bright transmissive display can be achieved.

Figure 8:
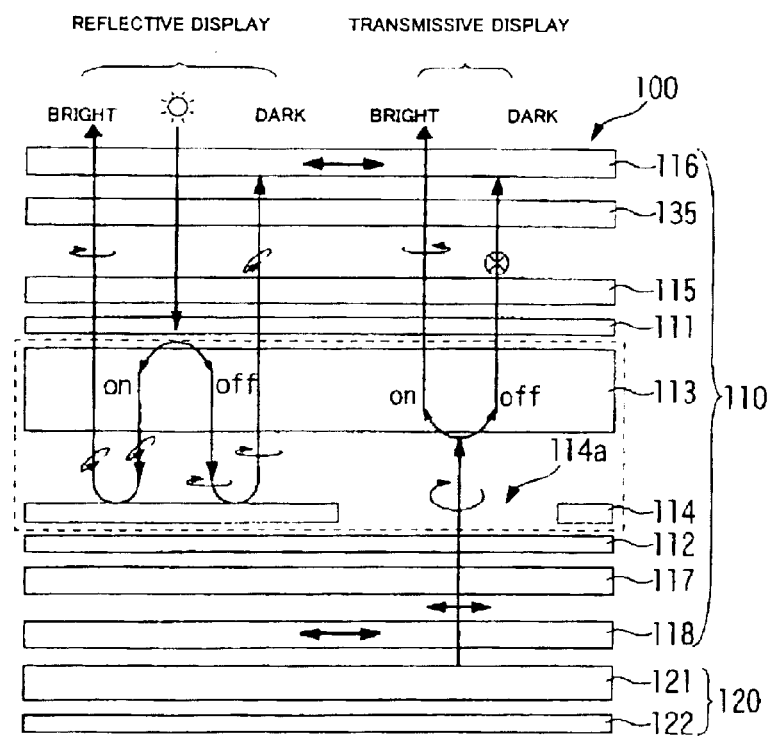
FIG. 8 illustrates the structure of a liquid crystal display device in cross section and display principles thereof, the liquid crystal display device having structural features of a liquid crystal display device shown in FIG. 10 with increased luminance in transmissive display.
Figure 9A:
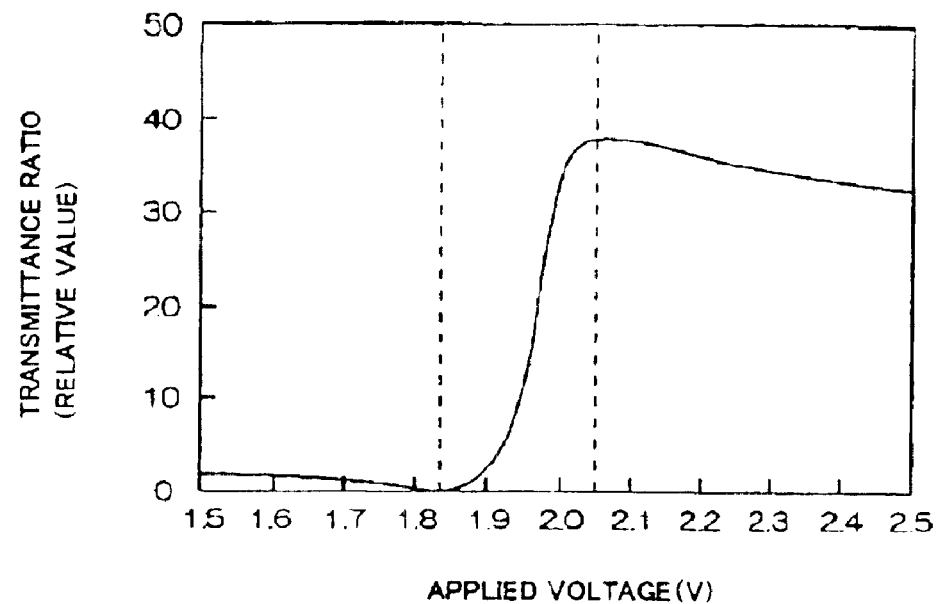
FIG. 9A is a graph of voltage characteristics in transmissive display in the liquid crystal display device shown in FIG. 8.
Figure 9B:
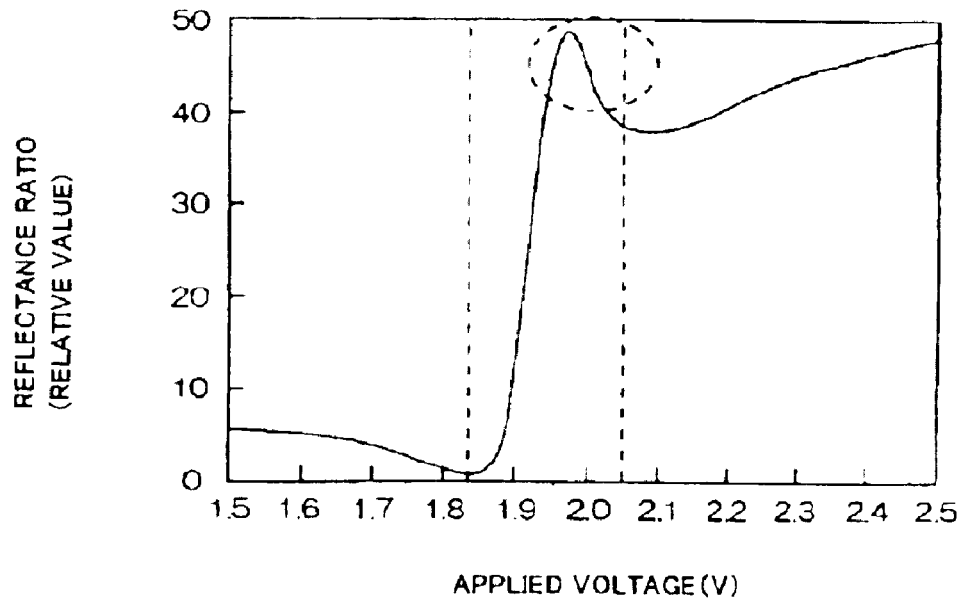
FIG. 9B is a graph of voltage characteristics in reflective display in the liquid crystal display device shown in FIG. 8.

By disposing the sloping reflective layer 14, after the light obliquely incident upon the liquid crystal panel 10 from above it has been reflected by the sloping reflective layer 14, the reflected light travels perpendicularly to the liquid crystal panel 10. Therefore, a path of display light exiting in the direction of the front surface of the liquid crystal panel 10 is longer than a light path in the liquid crystal display device shown in FIG. 8. Consequently, the problems of low contrast and tone reversal in reflective display in the liquid crystal display device shown in FIG. 8 are overcome, so that a good reflective display is achieved. Thus, the liquid crystal display device of the embodiment may be suitably used in applications requiring grayshade.

In the transmissive display, it is desirable that the ellipticity of light incident upon the upper polarizer 16 from the liquid crystal layer 13 be greater than 0 and equal to or less than 0.5. When the ellipticity lies in such a range, the quantity of light passing through the upper polarizer 16 can be relatively larger, so that it is possible to further increase the luminance of the transmissive display.

Although, in the first embodiment, the light emitted from the backlight 20 is described as being circularly polarized light when it impinges upon the liquid crystal layer 13, the light incident upon the liquid crystal layer 13 may be elliptically polarized light. In this case, the phase difference of the lower retardation film 17 is adjusted so that linearly polarized light that has passed through the lower polarizer 18 is converted into elliptically polarized light by the lower retardation film 17 disposed adjacent the lower substrate 12.

If the liquid crystal display device is formed so that elliptically polarized light is incident upon the liquid crystal layer 13, the ellipticity of light passing through the liquid crystal layer 13 and incident upon the upper polarizer 16, disposed at the side of the upper substrate, can be made even smaller, so that a brighter transmissive display can be provided.

Next, a description of a second embodiment of the present invention will be given with reference to FIG. 2. A liquid crystal display device shown in FIG. 2 is a transflective liquid crystal display device comprising a liquid crystal panel 30 and a backlight (illuminating device) 20, disposed at the back side (bottom side in FIG. 2) of the liquid crystal panel 30.

In the liquid crystal panel 30, a liquid crystal layer 13 is sandwiched between opposing upper and lower substrates 11 and 12, an off-axis anisotropic light scattering layer 32, an upper retardation film 15, and an upper polarizer 16 are stacked in that order upon the outer surface of the upper substrate 11, and a lower retardation film 17 and a lower polarizer 18 are stacked upon the outer surface of the lower substrate 12. At the liquid-crystal-layer-13 side of the lower substrate 12, a reflective layer 34 is formed partly within a dot area. At the liquid-crystal-layer-13 side of the upper substrate 11 and the lower substrate 12, although not shown, electrodes and alignment layers for controlling the alignment state of the liquid crystal layer 13 are formed. In some cases, a coloring layer for a color display may be provided. As shown in FIG. 2, the reflective layer 34 is formed partly within a dot area of the liquid crystal panel 30. Light from the backlight 20 is transmitted through a transmission area 34a where the reflective layer 34 is not formed in order to perform transmissive display. The backlight 20 has the same structure as that shown in FIG. 1.

The liquid crystal layer 13 of the liquid crystal panel used in the present invention comprises STN (super twisted nematic) liquid crystals whose molecules are oriented in a twisted manner at an angle in the range of from 220 to 270 degrees. The product of an optical anisotropy Δn of the liquid crystals and thickness d of the liquid crystal layer 13, that is, Δn·d, lies within the range of from 820 nm to 950 nm.

Figure 2:
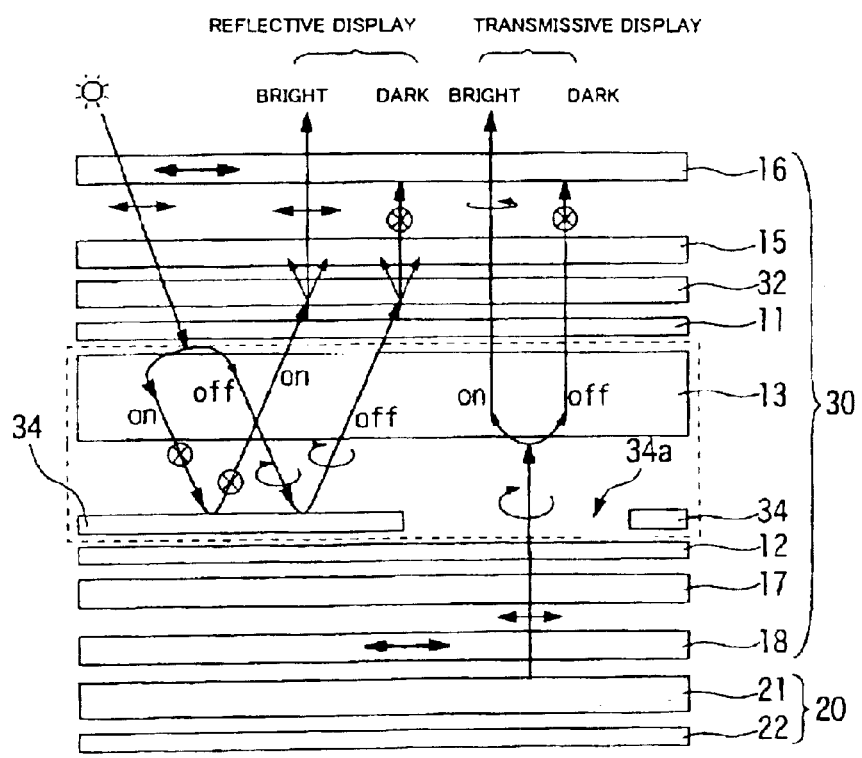
FIG. 2 illustrates the structure of a liquid crystal display device of a second embodiment of the present invention in cross section and display principles thereof.

The off-axis anisotropic light scattering layer 32 shown in FIG. 2 scatters light impinging thereupon from one surface thereof at a predetermined angle, and causes it to exit therefrom as transmission light having an optical axis extending in a direction that is different from the direction of the optical axis of the incident light. It provides a directional reflection function along with the reflective layer 34 in the liquid crystal display device of the embodiment.

For example, an off-axis anisotropic light scattering film that is disclosed in Japanese Unexamined Patent Application Publication No. 2001-123906 may be used as the off-axis anisotropic light scattering layer 32. The off-axis anisotropic light scattering film disclosed in the document is formed so that portions thereof having different refractive indices in the film and having irregular shapes and thicknesses are generally distributed in the form of strips, with the direction of extension of the strip distribution gradually varying in the film thickness direction. Therefore, it is possible to scatter light that is incident upon the off-axis anisotropic light scattering film from a predetermined angle, and to change the main direction of travel when the light passes through the film to a direction that is different from the direction of travel of the incident light. In addition, light that is incident upon the off-axis anisotropic light scattering film at an angle of incidence that is different from the predetermined angle is allowed to pass therethrough without being scattered.

In the liquid crystal display device of the embodiment, the above-described film is used for the off-axis anisotropic light scattering layer 32, and is disposed so that the angle at which light scattering occurs in the off-axis anisotropic light scattering layer 32 and the viewing angle that provides high luminance in a reflective display are the same. The characteristics of the off-axis anisotropic light scattering layer 32 can be adjusted so that light that has impinged thereupon at this angle exits therefrom in a direction perpendicular to the liquid crystal panel 30.

Next, the principles of display of the liquid crystal display device of the embodiment having the above-described structure will be described. The display principles of the transmissive display shown on the right side in FIG. 2 are the same as those of the transmissive display in the liquid crystal display device of the first embodiment, so that only the reflective display shown on the left side in FIG. 2 will be described below.

In the reflective display in the liquid crystal display device of the embodiment, light that has obliquely impinged upon the liquid crystal panel from above it is converted into linearly polarized light that is parallel to the plane of FIG. 2 by the upper polarizer 16 having a polarization axis parallel to the plane of FIG. 2. The converted light passes through the upper retardation film 15 and impinges upon the off-axis anisotropic light scattering layer 32. Since the angle of incidence of the light is different from the angle of incidence at which light scattering occurs in the off-axis anisotropic light scattering layer 32, the light passes through the off-axis anisotropic light scattering layer 32 with virtually no scattering, and impinges upon the liquid crystal layer 13.

When the liquid crystal layer 13 is in an on state (that is, in a state in which voltage is applied to the liquid crystals and the liquid crystal molecules are aligned along the electric field), as shown in FIG. 2, the light is converted into linearly polarized light that is substantially perpendicular to the plane of FIG. 2 by polarization conversion action of the upper retardation film 15 and the liquid crystal layer 13. The converted light impinges upon the reflective layer 34, and is, then, reflected by the reflective layer 34 in the specular reflection direction. The light is converted into linearly polarized light that is parallel to the plane of FIG. 2 by the liquid crystal layer 13 and the upper retardation film 15, and the converted light impinges upon the upper polarizer 16, so that a bright dot is displayed. Here, since, when the reflected light passes through the off-axis anisotropic light scattering layer 32, the angle of incidence of the reflected light is the same as the angle of incidence at which light scattering occurs in the off-axis anisotropic light scattering layer 32, the reflected light is scattered by the action of the off-axis anisotropic light scattering layer 32, and the scattered light passes through the off-axis anisotropic light scattering layer 32 with the main travel direction being perpendicular to the liquid crystal panel 30. By this, a bright dot is displayed in the direction perpendicular to the liquid crystal panel 30.

On the other hand, when the liquid crystal layer 13 is in an off state (that is, the orientation state of the liquid crystal molecules is the same as that when voltage is not applied), the light is converted into counterclockwise virtually circularly polarized light by the upper retardation film 15 and the liquid crystal layer 13, and the converted light reaches the reflective layer 34, is reflected thereby, and is converted into clockwise virtually circularly polarized light. Then, the light is converted into substantially linearly polarized light that is perpendicular to the plane of FIG. 2 by the liquid crystal layer 13 and the upper retardation film 15, and impinges upon the upper polarizer 16. The light is absorbed by the upper polarizer 16 having a polarization axis that is parallel to the plane of FIG. 2, so that a dark dot is displayed. Here, since, when the reflected light passes through the off-axis anisotropic light scattering layer 32, the angle of incidence of the reflected light is the same as the angle of incidence at which light scattering occurs in the off-axis anisotropic light scattering layer 32, the reflected light is scattered by the action of the off-axis anisotropic light scattering layer 32, and passes through the off-axis anisotropic light scattering layer 32 with the main travel direction being perpendicular to the liquid crystal panel 30. By this, a dark dot is displayed in the direction perpendicular to the liquid crystal panel 30.

In the liquid crystal display device of the embodiment performing a reflective display and a transmissive display based on the aforementioned display principles, as shown in FIG. 2, in the transmissive display, the light that is incident upon the upper polarizer 16 from the liquid crystal layer 13 is elliptically polarized light, so that, compared to the related liquid crystal display device 100 shown in FIG. 10, the quantity of light passing through the upper polarizer 16 can be increased, so that a bright transmissive display can be achieved.

By the directional reflection functions that are provided by the off-axis anisotropic light scattering layer 32 and the reflective layer 34, the problems of low contrast and tone reversal in reflective display in the liquid crystal display device shown in FIG. 8 are overcome, so that a good reflective display is achieved. More specifically, in the liquid crystal display device shown in FIG. 8, the display is brighter at a low viewing angle than in the direction of the front surface of the panel. Therefore, when, as shown in FIG. 2, the off-axis anisotropic light scattering layer 32 is disposed with the specular reflection direction of light obliquely incident upon the liquid crystal panel 30 from above it and the angle of incidence of light at which light is scattered by the off-axis anisotropic light scattering layer 32 being the same, and when the characteristic (off-axis characteristic) which changes the direction of travel of light through the off-axis anisotropic light scattering layer 32 is adjusted so that light that is incident upon the off-axis anisotropic light scattering layer 32 at the aforementioned angle exits therefrom in the direction perpendicular to the liquid crystal panel 30, it is possible for the display luminance that is obtained at a low viewing angle in the liquid crystal display device shown in FIG. 8 to be provided in the direction of the front surface of the liquid crystal panel 30. Therefore, a reflective display with high luminance is achieved.

Therefore, the liquid crystal display device of the embodiment can provide both good transmissive and reflective displays with high luminance and high contrast.

Although, in the embodiment, a transmissive display that is achieved by transmitting light from the backlight 20 through the transmission area 34a where the reflective layer 34, which is formed partly within a dot area, is not formed as described with reference to FIG. 2, the reflective layer having the transmission area 34a does not necessarily have to be used in the liquid crystal display device of the embodiment. It should be understood that any reflective layer which partly transmits and reflects incident light may be used without any problem. For example, a half mirror using a dielectric multilayer or a transflective layer whose reflective metallic layer has its thickness adjusted may be used.

From the aforementioned viewpoints that it is desirable that, in transmissive display, the ellipticity of light incident upon the upper polarizer 16 from the liquid crystal layer 13 be greater than 0 and equal to or less than 0.5, and that, in transmissive display, light incident upon the liquid crystal layer 13 from the backlight 20 can be elliptically polarized light, the structure may be used in the liquid crystal display device of the embodiment. The liquid crystal display device of the second embodiment can provide the same advantages as those of the liquid crystal display device of the first embodiment.

Next, a description of a third embodiment of the present invention will be given with reference to FIG. 3. A liquid crystal display device shown in FIG. 3 is a transflective liquid crystal display device comprising a liquid crystal panel 40 and a backlight (illuminating device) 20, disposed at the back side (bottom side in FIG. 3) of the liquid crystal panel 40.

In the liquid crystal panel 40, a liquid crystal layer 13 is sandwiched between opposing upper and lower substrates 11 and 12, an upper retardation film 15 and an upper polarizer 16 are stacked in that order upon the outer surface of the upper substrate 11, and a lower retardation film 17 and a lower polarizer 18 are stacked upon the outer surface of the lower substrate 12. At the liquid-crystal-layer-13 side of the lower substrate 12, a reflective layer 34 is formed partly within a dot area, and a front-transmission, rear-diffraction layer (an anisotropic optical layer) 41 is disposed above a plane area of the reflective layer 34. At the liquid-crystal-layer-13 side of the upper substrate 11 and the lower substrate 12, although not shown, electrodes and alignment layers for controlling the alignment state of the liquid crystal layer 13 are formed. In some cases, a coloring layer for a color display may be provided. As shown in FIG. 3, the reflective layer 34 can be formed partly within a dot area of the liquid crystal panel 40. Light from the backlight 20 is transmitted through a transmission area 34a where the reflective layer 34 is not formed in order to perform transmissive display. The backlight 20 has the same structure as that shown in FIG. 1.

The liquid crystal layer 13 of the liquid crystal panel used in the present invention can include STN (super twisted nematic) liquid crystals whose molecules are oriented in a twisted manner at an angle in the range of from 220 to 270 degrees. The product of an optical anisotropy Δn of the liquid crystals and thickness d of the liquid crystal layer 13, that is, Δn·d, lies within the range of from 820 nm to 950 nm.

Figure 3:
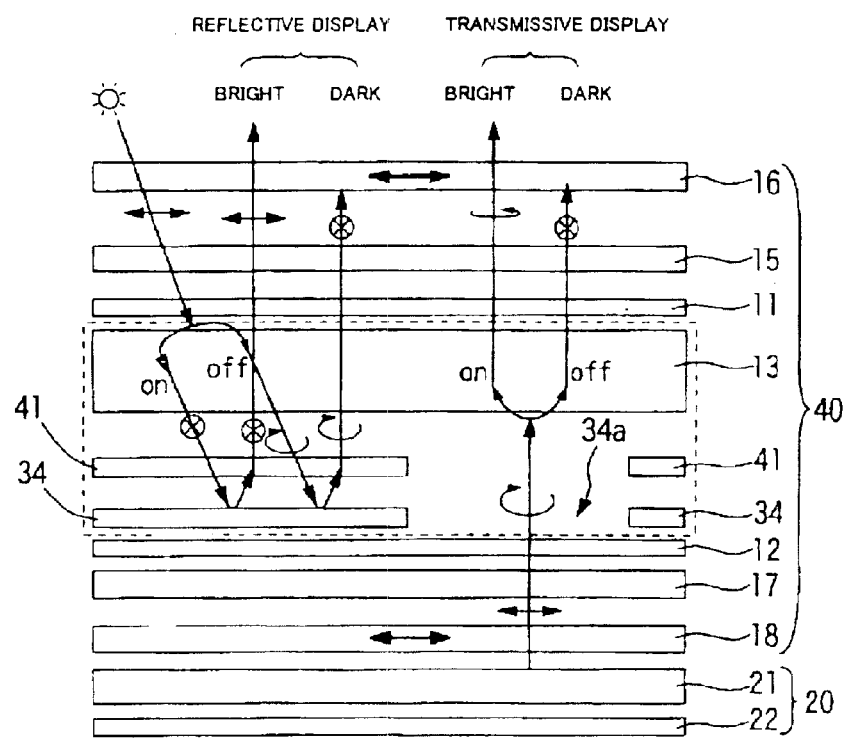
FIG. 3 illustrates the structure of a liquid crystal display device of a third embodiment of the present invention in cross section and display principles thereof.

The front-transmission, rear-diffraction layer 41 shown in FIG. 3 has the function of transmitting light incident thereupon from one of the principal surfaces (front surface) without acting upon the incident light in any way and the function of diffracting light incident thereupon from the opposite principal surface (rear surface), and provides, along with the reflective layer 34, a directional reflection function in the liquid crystal display device of the embodiment.

For example, a front-transmission, rear-diffraction member that is disclosed in Japanese Unexamined Patent Application Publication No. 2000-180607 may be used as the front-transmission, rear-diffraction layer 41. The front-transmission, rear-diffraction member that is disclosed in this document diffracts light by a hologram recorded in a film.

In the liquid crystal display device of the embodiment, the front-transmission, rear-diffraction member that is disclosed in this document is used for the front-transmission, rear-diffraction layer 41, and is disposed so that the transmission surface (front surface) of the front-transmission, rear-diffraction layer 41 is disposed adjacent the liquid crystal layer 13. The diffraction angle of the front-transmission, rear-diffraction layer 41 is adjusted so that it is the same as the viewing angle at which a high luminance is obtained in reflective display and angle defined by a direction perpendicular to the liquid crystal panel 40.

Next, the principles of display of the liquid crystal display device of the embodiment having the above-described structure will be described. The principles of the transmissive display shown on the right side in FIG. 3 are the same as those of the transmissive display in the liquid crystal display device of the first embodiment, so that only the reflective display shown on the left side in FIG. 3 will be described below.

In the reflective display in the liquid crystal display device of the embodiment, light that has obliquely impinged upon the liquid crystal panel 40 from above it is converted into linearly polarized light that is parallel to the plane of FIG. 3 by the upper polarizer 16 having a polarization axis parallel to the plane of FIG. 3. When the liquid crystal layer 13 is in an on state (that is, in a state in which voltage is applied to the liquid crystals and the liquid crystal molecules are aligned along the electric field), as shown in FIG. 3, the light is converted into linearly polarized light that is perpendicular to the plane of FIG. 3 by polarization conversion action of the upper retardation film 15 and the liquid crystal layer 13. Then, the converted light is incident upon the front-transmission, rear-diffraction layer 41. In the liquid crystal display device of the embodiment, the front-transmission, rear-diffraction layer 41 transmits the light that is incident upon the liquid-crystal-layer-13-side surface of the front-transmission, rear-diffraction layer 41 without acting upon the light, so that the light impinges upon the reflective layer 34 as it is, is reflected in the specular reflection direction by the reflective layer 34, and impinges upon the front-transmission, rear-diffraction layer 41 from the reflective layer 34. The light is diffracted by the front-transmission, rear-diffraction layer 41 and is made to travel perpendicularly to the liquid crystal panel 40. Then, after the light is converted into substantially linearly polarized light that is parallel to the plane of FIG. 3 by the liquid crystal layer 13 and the upper retardation film 15, the converted light impinges upon the upper polarizer 16, and exits therefrom perpendicularly to the liquid crystal panel 40, so that a bright dot is displayed.

On the other hand, when the liquid crystal layer 13 is in an off state (that is, the orientation state of the liquid crystal molecules is the same as that when voltage is not applied), the light is converted into counterclockwise virtually circularly polarized light by the upper retardation film 15 and the liquid crystal layer 13, and the converted light impinges upon the front-transmission, rear-diffraction layer 41. After the light has been transmitted through the front-transmission, rear-diffraction layer 41, the light reaches the reflective layer 34, is reflected thereby, and is converted into clockwise circularly polarized light. Then, the light impinges upon the front-transmission, rear-diffraction layer 41 again and is diffracted. The light is made to travel perpendicularly to the liquid crystal panel 40 and impinges upon the liquid crystal layer 13. Then, the light is converted into linearly polarized light that is perpendicular to the plane of FIG. 3 by the liquid crystal layer 13 and the upper retardation film 15, and is absorbed by the upper polarizer 16 having a polarization axis that is parallel to the plane of FIG. 3, so that a dark dot is displayed.

In the liquid crystal display device of the embodiment performing a reflective display and a transmissive display based on the aforementioned display principles, as shown in FIG. 3, in the transmissive display, the light that is incident upon the upper polarizer 16 from the liquid crystal layer 13 is elliptically polarized light, so that, compared to the related liquid crystal display device 100 shown in FIG. 10, the quantity of light passing through the upper polarizer 16 can be increased, so that a bright transmissive display can be achieved.

By the directional reflection functions that are provided by the front-transmission, rear-diffraction layer 41 and the reflective layer 34, the problems of low contrast and tone reversal in reflective display in the liquid crystal display device shown in FIG. 8 are overcome, so that a good reflective display is achieved. More specifically, in the liquid crystal display device shown in FIG. 8, the display is brighter at a low viewing angle than in the direction of the front surface of the panel. Therefore, when, as shown in FIG. 3, light that has obliquely impinged upon the liquid crystal panel 40 from above it is diffracted at the reflective-layer-34-side of the liquid crystal layer 13, a path of light exiting in the direction of the front surface of the liquid crystal panel 40 is longer than a path of display light exiting in the direction of the front surface of the liquid crystal display device shown in FIG. 8.

In this way, by making it possible to provide the display luminance that is obtained at a low viewing angle in the liquid crystal display device shown in FIG. 8 in the direction of the front surface of the liquid crystal panel 40, the liquid crystal display device of the embodiment provides a good reflective display. Therefore, the liquid crystal display device of the embodiment can provide both good transmissive and reflective displays with high luminance and high contrast.

From the aforementioned viewpoints that it can be desirable that, in transmissive display, the ellipticity of light incident upon the upper polarizer 16 from the liquid crystal layer 13 be greater than 0 and equal to or less than 0.5, and that, in transmissive display, light incident upon the liquid crystal layer 13 from the backlight 20 can be elliptically polarized light, the structure may be used in the liquid crystal display device of the embodiment. The liquid crystal display device of the third embodiment can provide the same advantages as those of the liquid crystal display device of the first embodiment.

Figure 4:
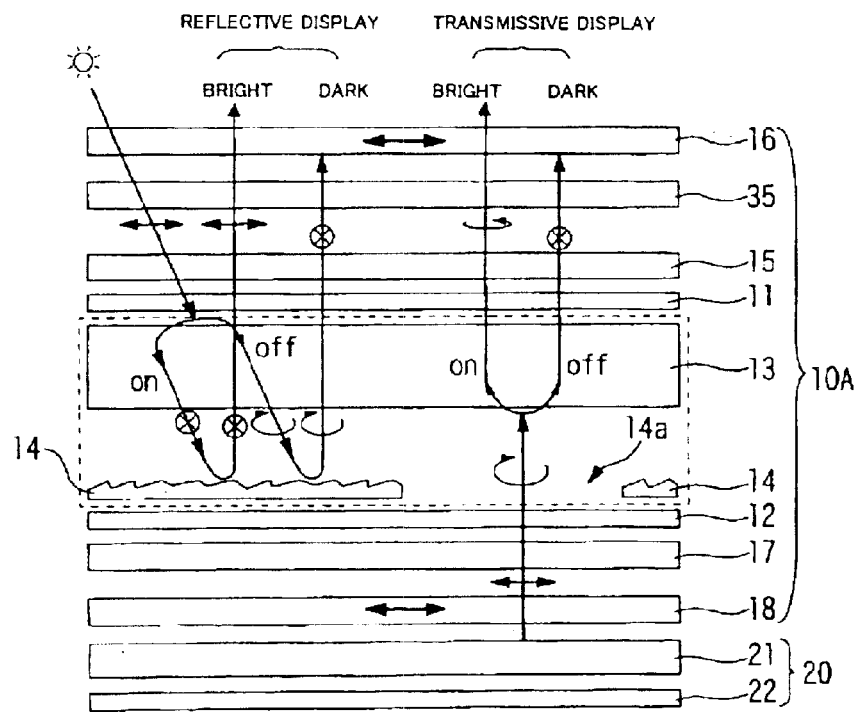
FIG. 4 illustrates the structure of a liquid crystal display device of a fourth embodiment of the present invention in cross section and display principles thereof.

FIG. 4 illustrates the structure of a liquid crystal display device of a fourth embodiment of the present invention in cross-section, and display principles thereof. A liquid crystal display device shown in FIG. 4 is a transflective liquid crystal display device having a liquid crystal panel 10A and a backlight (illuminating device) 20, disposed at the back side (bottom side in FIG. 4) of the liquid crystal panel 10A.

In the liquid crystal panel 10A, a liquid crystal layer 13 is sandwiched between opposing upper and lower substrates 11 and 12, an upper retardation film 15, a temperature compensation retardation film (upper retardation layer) 35, and an upper polarizer 16 are stacked in that order upon the outer surface of the upper substrate 11, and a lower retardation film (lower retardation layer) 17 and a lower polarizer 18 are stacked upon the outer surface of the lower substrate 12. At the liquid-crystal-layer-13 side of the lower substrate 12, a sloping reflective layer (transflective layer) 14 can be formed partly within a dot area. At the liquid-crystal-layer-13 side of the upper substrate 11 and the lower substrate 12, although not shown, electrodes and alignment layers for controlling the alignment state of the liquid crystal layer 13 are formed. In some cases, a coloring layer for a color display may be provided. As shown in FIG. 4, the sloping reflective layer 14 is formed partly within a dot area of the liquid crystal panel 10A. Light from the backlight 20 is transmitted through a transmission area 14a where the sloping reflective layer 14 is not provided in order to perform a transmissive displaying operation.

The backlight 20 can include a light guide plate 21, a reflective plate 22, disposed at the outer surface of the light guide plate 21, and a light source (not shown), disposed at an end surface of the light guide plate 21.

The temperature compensation retardation film 35 used in the embodiment is such that the ratio between R70 and R25 (R70/R25) is set within a range of Condition (3) below using an N-I point (Tni) of the liquid crystals of the liquid crystal layer 13, where R25 is the product of an optical anisotropy Δn thereof and thickness d thereof, that is, Δn·d, at 25° C., and R70 is that at 70° C. By using the temperature compensation retardation film 35 having its temperature characteristics controlled within the following range, even if the Δn·d value of the liquid crystal layer 13 changes with changes in the environmental temperature, the Δn·d value of the temperature compensation retardation film 35 changes in accordance with it, so that optical compensation of display light exiting in the direction of the front surface of the liquid crystal panel 10A is properly carried out by the temperature compensation retardation film 35.

$$\left(\frac{T_{ni}-80}{T_{ni}-20}\right)^{0.22} < \frac{R70}{R25} < \left(\frac{T_{ni}-30}{T_{ni}-20}\right)^{0.22} \qquad (3)$$

An optical anisotropic film whose liquid crystal polymers are dispersed may be used as the temperature compensation retardation film 35. More specifically, it is possible to use, for example, a film including a liquid crystal composition having a torsional axis in the film thickness direction and exhibiting a cholesteric phase, or a film comprising liquid crystal olygomeric polymeric material. In the temperature compensation retardation film 35 using either of these films, in order to adjust the ratio R70/R25, for example, the number of repeating units of liquid crystal olygomer, the spacer length connecting the main chain and mesogen, or the degree of cross-linking of the liquid crystal olygomer is adjusted. Therefore, even if the type of liquid crystals of the liquid crystal layer 13 is changed, adjustment of the ratio R70/R25 within a range in which the N–I point of the liquid crystals is derived based on Condition (3) above makes it possible to restrict a reduction in the display quality with changes in environmental temperature.

It is more desirable that the ratio R70/R25 lie within a range of Condition (4) below. If the ratio lies within this range, a liquid crystal display device which makes it possible to more effectively restrict a reduction in the display quality with changes in the environmental temperature can be provided.

$$\left(\frac{T_{ni}-75}{T_{ni}-20}\right)^{0.22} < \frac{R70}{R25} < \left(\frac{T_{ni}-40}{T_{ni}-20}\right)^{0.22} \qquad (4)$$

The liquid crystal layer 13 of the liquid crystal panel used in the present invention comprises STN (super twisted nematic) liquid crystals whose molecules are oriented in a twisted manner at an angle in the range of from 220 to 270 degrees. The product of an optical anisotropy $\Delta n$ of the liquid crystals and thickness d of the liquid crystal layer 13, that is, $\Delta n \cdot d$, lies within the range of from 820 nm to 950 nm. If the $\Delta n \cdot d$ value falls outside the aforementioned range and becomes less than 820 nm, improvement in the transmittance ratio cannot be expected, whereas if it becomes greater than 950 nm, tone reversal when light is reflected cannot be overcome.

The sloping reflective layer 14 shown in FIG. 4 is a reflective layer having the function of causing incident light to exit in a direction that is different from the specular reflection direction, and provides the directional reflection function in the liquid crystal display device of the embodiment. For example, as shown in FIG. 11A, the sloping reflective layer 14 may comprise a bumpy resinous film 14*d* having disposed thereat a plurality of triangular prismatic protrusions 14*b* with ridge lines that extend in the same direction, having a bumpy form defined by two inclined surfaces of protrusions 14*b* with different inclination angles, and having fine bumps 14*f* disposed on the surface of the inclined surfaces, and a reflective film 14*c* formed on the surface of the bumpy resinous film 14*d*. Alternatively, as shown in FIG. 11B, the sloping reflective layer 14 may comprise a bumpy resinous film 14*d* having disposed thereat a plurality of triangular prismatic protrusions 14*b*, which have ridge lines that extend in the same direction and which slope in the direction of a plane, and having a bumpy form defined by a plurality of inclined surfaces 14*e*, which form part of a side surfaces thereof and which have substantially randomly different inclination angles; and a reflective film 14*c* formed on the surface of the bumpy resinous film 14*d*.

In the embodiment, the reflection characteristics of the sloping reflective layer 14 are determined by the main inclination angle between the inclined surfaces of the triangular prismatic protrusions 14*b* so that light obliquely incident upon the liquid crystal panel 10 from above it and reflected by the sloping reflective layer 14 exits in a direction perpendicular to the liquid crystal panel 10A. In FIG. 11A, the scattering effect of the reflected light is achieved by, for example, differences in shape and density of the fine bumpy portions 14*f*, whereas, in FIG. 11B, it is achieved by differences in the inclination of the fine inclined surfaces 14*e*. The top portions of the triangular prismatic protrusions 14*b* shown in FIGS. 11A and 1B may be rounded. Alternatively, a thin metallic film disclosed in Japanese Unexamined Patent Application Publication No. 10-177106 may be used.

Next, the principles of display of the liquid crystal display device of the embodiment having the above-described structure will be described.

First, in reflective display shown on the left in FIG. 4, light that has obliquely impinged upon the liquid crystal panel 10A from above it is converted into linearly polarized light that is parallel to the plane of FIG. 4 by the upper polarizer 16 having a polarization axis that is parallel to the plane of FIG. 4. The linearly polarized light is transmitted through the upper retardation film 15 and impinges upon the liquid crystal layer 13. Then, when the liquid crystal layer 13 is in an on state (that is, in a state in which voltage is applied to the liquid crystals and the liquid crystal molecules are aligned along the electric field), as shown in FIG. 4, the light is converted into linearly polarized light that is substantially perpendicular to the plane of FIG. 4 by polarization conversion action of the upper retardation film 15 and the liquid crystal layer 13. The converted light impinges upon the sloping reflective layer 14, is reflected in the direction perpendicular to the liquid crystal panel 10A by the action of the sloping reflective layer 14, and is converted into linearly polarized light that is parallel to the plane of FIG. 4 by the liquid crystal layer 13 and then the upper retardation film 15. The converted light impinges upon the upper polarizer 16, and exits therefrom in the direction perpendicular to the liquid crystal panel 10A, so that a bright dot is displayed (bright display).

On the other hand, when the liquid crystal layer 13 is in an off state (that is, the orientation state of the liquid crystal molecules is the same as that when voltage is not applied), light that has impinged upon the upper retardation film 15 passes through the upper retardation film 15 and the liquid crystal layer 13 and reaches the sloping reflective layer 14 where the light is converted into a counterclockwise virtually circularly polarized light. The converted light is reflected perpendicularly to the liquid crystal panel 10A, and is converted into a clockwise virtually circularly polarized light. Then, the light is converted into linearly polarized light that is perpendicular to the plane of FIG. 4 by the liquid crystal layer 13 and the upper retardation film 15, and the converted light is absorbed by the upper polarizer 16 having a polarization axis parallel to the plane of FIG. 4, so that a dark dot is displayed (dark display).

Next, in transmissive display, light emitted from the backlight 20 is converted into linearly polarized light parallel to the plane of FIG. 4 by the lower polarizer 18, and is, then, converted into clockwise circularly polarized light by the lower retardation film 17. The converted light impinges upon the liquid crystal layer 13 through the transmission area 14*a* where the sloping reflective layer 14 is not formed. When the liquid crystal layer 13 is in an on state, the light is converted into an elliptically polarized light having a major axis substantially parallel to the polarization axis of the upper polarizer 16 by polarization conversion action of the liquid crystal layer 13 and the upper retardation film 15, and the converted light is incident upon the upper polarizer 16. A component of the light that is parallel to the polarization axis of the upper polarizer 16 is only transmitted through the upper polarizer 16, so that a bright dot is displayed.

On the other hand, when the liquid crystal layer 13 is in an off state, the clockwise circularly polarized light is transmitted through the liquid crystal layer 13, and is converted into linearly polarized light perpendicular to the plane of FIG. 4 by the upper retardation film 15, and the converted light is incident upon the upper polarizer 16. Then, the light is absorbed by the upper polarizer 16 having a polarization axis parallel to the plane of FIG. 4, so that a dark dot is displayed.

In the liquid crystal display device of the embodiment for performing a reflective display and a transmissive display based on the above-described display principles, as shown in FIG. 4, in the transmissive display, light incident upon the upper polarizer 16 from the liquid crystal layer 13 is elliptically polarized light, so that, compared to the related liquid crystal display device 100 shown in FIG. 10, it is possible to increase the quantity of light passing through the upper polarizer 16, so that a bright transmissive display can be achieved.

By disposing the sloping reflective layer 14, after light obliquely incident upon the liquid crystal panel 10A from above it has been reflected by the sloping reflective layer 14, the reflected light travels perpendicularly to the liquid crystal panel 10A. Therefore, a path of display light exiting in the direction of the front surface of the liquid crystal panel 10A is longer than a light path in the liquid crystal display device shown in FIG. 8. Consequently, the problems of low contrast and tone reversal in reflective display in the liquid crystal display device shown in FIG. 8 are overcome, so that a good reflective display is achieved. Thus, the liquid crystal display device of the embodiment may be suitably used in applications requiring grayshade.

In the transmissive display, it is desirable that the ellipticity of light emitted from the backlight 20 and incident upon the upper polarizer 16 from the liquid crystal layer 13 be greater than 0 and equal to or less than 0.5. When the ellipticity lies in such a range, the quantity of light passing through the upper polarizer 16 can be relatively large, so that it is possible to further increase the luminance of the transmissive display.

Although, in the first embodiment, the light emitted from the backlight 20 is described as being circularly polarized light when it impinges upon the liquid crystal layer 13, the light incident upon the liquid crystal layer 13 may be elliptically polarized light. In this case, the phase difference of the lower retardation film 17 is adjusted so that linearly polarized light that has passed through the lower polarizer 18 is converted into elliptically polarized light by the lower retardation film 17 disposed adjacent the lower substrate 12.

If the liquid crystal display device is formed so that elliptically polarized light is incident upon the liquid crystal layer 13, the ellipticity of light passing through the liquid crystal layer 13 and incident upon the upper polarizer 16, disposed at the side of the upper substrate, can be made even smaller, so that a brighter transmissive display can be provided.

Figure 5:
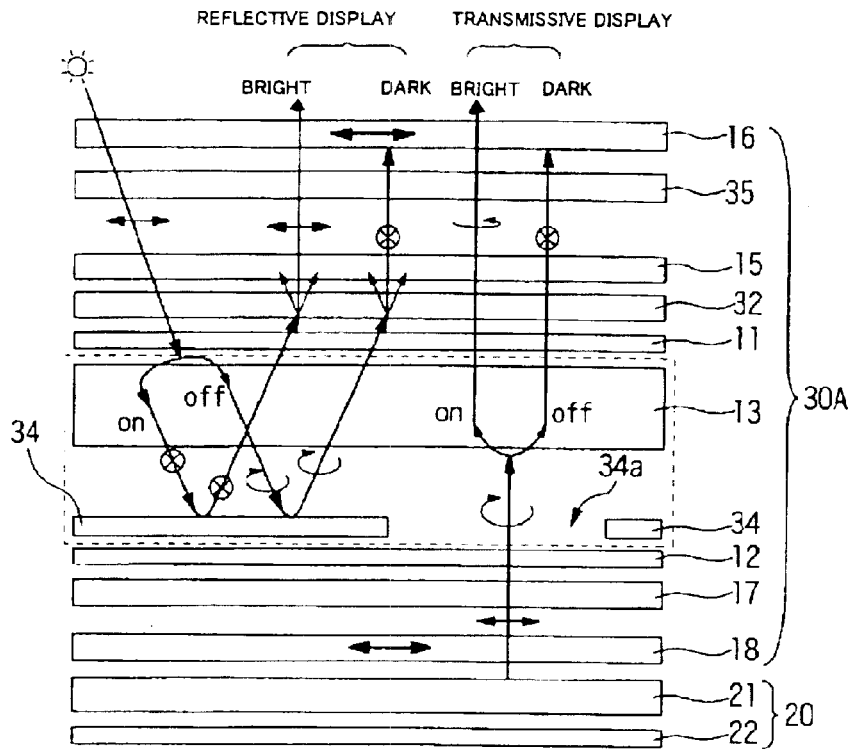
FIG. 5 illustrates the structure of a liquid crystal display device of a fifth embodiment of the present invention in cross section and display principles thereof.

Next, a description of a fifth embodiment of the present invention will be given with reference to FIG. 5. A liquid crystal display device shown in FIG. 5 is a transflective liquid crystal display device comprising a liquid crystal panel 30A and a backlight (illuminating device) 20, disposed at the back side (bottom side in FIG. 5) of the liquid crystal panel 30A.

In the liquid crystal panel 30A, a liquid crystal layer 13 can be sandwiched between opposing upper and lower substrates 11 and 12, an off-axis anisotropic light scattering layer 32, an upper retardation film 15, a temperature compensation retardation film (upper retardation layer) 35, and an upper polarizer 16 are stacked in that order upon the outer surface of the upper substrate 11, and a lower retardation film 17 and a lower polarizer 18 are stacked upon the outer surface of the lower substrate 12. At the liquid-crystal-layer-13 side of the lower substrate 12, a reflective layer 34 can be formed partly within a dot area. At the liquid-crystal-layer-13 side of the upper substrate 11 and the lower substrate 12, although not shown, electrodes and alignment layers for controlling the alignment state of the liquid crystal layer 13 are formed. In some cases, a coloring layer for a color display may be provided. As shown in FIG. 5, the reflective layer 34 is formed partly within a dot area of the liquid crystal panel 30A. Light from the backlight 20 is transmitted through a transmission area 34a where the reflective layer 34 is not formed in order to perform transmissive display. The backlight 20 has the same structure as that shown in FIG. 4.

The liquid crystal layer 13 of the liquid crystal panel used in the present invention can include STN (super twisted nematic) liquid crystals whose molecules are oriented in a twisted manner at an angle in the range of from 220 to 270 degrees. The product of an optical anisotropy $\Delta n$ of the liquid crystals and thickness d of the liquid crystal layer 13, that is, $\Delta n \cdot d$, lies within the range of from 820 nm to 950 nm.

As in the liquid crystal display device of the fourth embodiment, the $\Delta n \cdot d$ value of the temperature compensation retardation film 35 is also adjusted so as to fall within the range of Condition (1) in order to make it possible to restrict a reduction in the display quality caused by changes in environmental temperature.

The off-axis anisotropic light scattering layer 32 shown in FIG. 5 scatters light incident thereupon from one surface thereof at a predetermined angle, and causes it to exit therefrom as transmission light having an optical axis extending in a direction that is different from the direction of the optical axis of the incident light. It provides a directional reflection function along with the reflective layer 34 in the liquid crystal display device of the embodiment.

For example, an off-axis anisotropic light scattering film that is disclosed in Japanese Unexamined Patent Application Publication No. 2001-123906 may be used as the off-axis anisotropic light scattering layer 32. The off-axis anisotropic light scattering film disclosed in the document is formed so that portions thereof having different refractive indices in the film and having irregular shapes and thicknesses are generally distributed in the form of strips, with the direction of extension of the strip distribution gradually varying in the film thickness direction. Therefore, it is possible to scatter light that is incident upon the off-axis anisotropic light scattering film at a predetermined angle, and to change the main direction of travel when the light passes through the film to a direction that is different from the direction of travel of the incident light. In addition, light that is incident upon the off-axis anisotropic light scattering film at an angle of incidence that is different from the predetermined angle is allowed to pass therethrough without being scattered.

In the liquid crystal display device of the embodiment, the above-described film is used for the off-axis anisotropic light scattering layer 32, and is disposed so that the angle at which light scattering occurs in the off-axis anisotropic light scattering layer 32 and the viewing angle that provides high luminance in a reflective display are the same. The characteristics of the off-axis anisotropic light scattering layer 32 are adjusted so that light that has impinged thereupon at this angle exits therefrom perpendicularly to the liquid crystal panel 30A.

Next, the principles of display of the liquid crystal display device of the embodiment having the above-described structure will be described. The display principles of the transmissive display shown on the right side in FIG. 5 are the same as those of the transmissive display in the liquid crystal display device of the fourth embodiment, so that only the reflective display shown on the left side in FIG. 5 will be described below.

In the reflective display in the liquid crystal display device of the embodiment, light that has obliquely impinged upon the liquid crystal panel 30A from above it is converted into linearly polarized light that is parallel to the plane of FIG. 5 by the upper polarizer 16 having a polarization axis parallel to the plane of FIG. 5. Then, the converted light passes through the upper retardation film 15 and impinges upon the off-axis anisotropic light scattering layer 32. Since the angle of incidence of the light is different from the angle of incidence at which light scattering occurs in the off-axis anisotropic light scattering layer 32, the light passes through the off-axis anisotropic light scattering layer 32 with virtually no scattering, and impinges upon the liquid crystal layer 13.

When the liquid crystal layer 13 is in an on state (that is, in a state in which voltage is applied to the liquid crystals and the liquid crystal molecules are aligned along the electric field), as shown in FIG. 5, the light is converted into linearly polarized light that is substantially perpendicular to the plane of FIG. 5 by polarization conversion action of the upper retardation film 15 and the liquid crystal layer 13. The converted light impinges upon the reflective layer 34, and is, then, reflected by the reflective layer 34 in the specular reflection direction. The light is converted into linearly polarized light that is parallel to the plane of FIG. 5 by the liquid crystal layer 13 and the upper retardation film 15, and the converted light impinges upon the upper polarizer 16, so that a bright dot is displayed. Here, since, when the reflected light passes through the off-axis anisotropic light scattering layer 32, the angle of incidence of the reflected light is the same as the angle of incidence at which light scattering occurs in the off-axis anisotropic light scattering layer 32, the reflected light is scattered by the action of the off-axis anisotropic light scattering layer 32, and passes through the off-axis anisotropic light scattering layer 32 with the main travel direction being perpendicular to the liquid crystal panel 30A. By this, a bright dot is displayed perpendicularly to the liquid crystal panel 30A.

On the other hand, when the liquid crystal layer 13 is in an off state (that is, the orientation state of the liquid crystal molecules is the same as that when voltage is not applied), the light is converted into a counterclockwise virtually circularly polarized light by the upper retardation film 15 and the liquid crystal layer 13, and the converted light reaches the reflective layer 34, is reflected thereby, and is converted into clockwise virtually circularly polarized light. Then, the light is converted into substantially linearly polarized light that is perpendicular to the plane of FIG. 5 by the liquid crystal layer 13 and the upper retardation film 15, and impinges upon the upper polarizer 16. The light is absorbed by the upper polarizer 16 having a polarization axis that is parallel to the plane of FIG. 5, so that a dark dot is displayed. Here, since, when the reflected light passes through the off-axis anisotropic light scattering layer 32, the angle of incidence of the reflected light is the same as the angle of incidence at which light scattering occurs in the off-axis anisotropic light scattering layer 32, the reflected light is scattered by the action of the off-axis anisotropic light scattering layer 32, and passes through the off-axis anisotropic light scattering layer 32 with the main travel direction being perpendicular to the liquid crystal panel 30A. By this, a dark dot is displayed perpendicularly to the liquid crystal panel 30A.

In the liquid crystal display device of the embodiment performing a reflective display and a transmissive display based on the aforementioned display principles, as shown in FIG. 5, in the transmissive display, light that is incident upon the upper polarizer 16 from the liquid crystal layer 13 is elliptically polarized light, so that, compared to the related liquid crystal display device 100 shown in FIG. 10, the quantity of light passing through the upper polarizer 16 can be increased, so that a bright transmissive display can be provided.

By the directional reflection functions that are provided by the off-axis anisotropic light scattering layer 32 and the reflective layer 34, the problems of low contrast and tone reversal in reflective display in the liquid crystal display device shown in FIG. 8 are overcome, so that a good reflective display is achieved. More specifically, in the liquid crystal display device shown in FIG. 8, the display is brighter at a low viewing angle than in the direction of the front surface of the panel. Therefore, when, as shown in FIG. 5, the off-axis anisotropic light scattering layer 32 is disposed with the specular reflection direction of light obliquely incident upon the liquid crystal panel 30A from above it and the angle of incidence of light at which light is scattered by the off-axis anisotropic light scattering layer 32 being the same, and when the characteristic (off-axis characteristic) which changes the direction of travel of light through the off-axis anisotropic light scattering layer 32 is adjusted so that light that is incident upon the off-axis anisotropic light scattering layer 32 at the aforementioned angle exits therefrom perpendicularly to the liquid crystal panel 30A, it is possible for the display luminance that is obtained at a low viewing angle in the liquid crystal display device shown in FIG. 8 to be provided in the direction of the front surface of the liquid crystal panel 30A. Therefore, a reflective display with high luminance is achieved.

By disposing the temperature compensation retardation film 35, even if an Δn·d value of the liquid crystal layer 13 changes with changes in the environmental temperature, optical compensation of display light is properly carried out, so that a high quality display is provided over a wide temperature region. Therefore, the liquid crystal display device of the embodiment can provide both good transmissive and reflective displays with high luminance and high contrast over a wide temperature region.

Although, in the embodiment, a transmissive display that is achieved by transmitting light from the backlight 20 through the transmission area 34a where the reflective layer 34, which is formed partly within a dot area, is not formed is described with reference to FIG. 5, the reflective layer having the transmission area 34a does not necessarily have to be used in the liquid crystal display device of the embodiment. Any reflective layer which partly transmits and reflects incident light may be used without any problem. For example, a half mirror using a dielectric multilayer or a transflective layer whose reflective metallic layer has its thickness adjusted may be used.

From the aforementioned viewpoints that it can be desirable that, in transmissive display, the ellipticity of light incident upon the upper polarizer 16 from the liquid crystal layer 13 be greater than 0 and equal to or less than 0.5, and that, in transmissive display, light incident upon the liquid crystal layer 13 from the backlight 20 is elliptically polarized light, the structure may be used in the liquid crystal display device of the embodiment. The liquid crystal display device of the fifth embodiment can provide the same advantages as those of the liquid crystal display device of the fourth embodiment.

Figure 6:
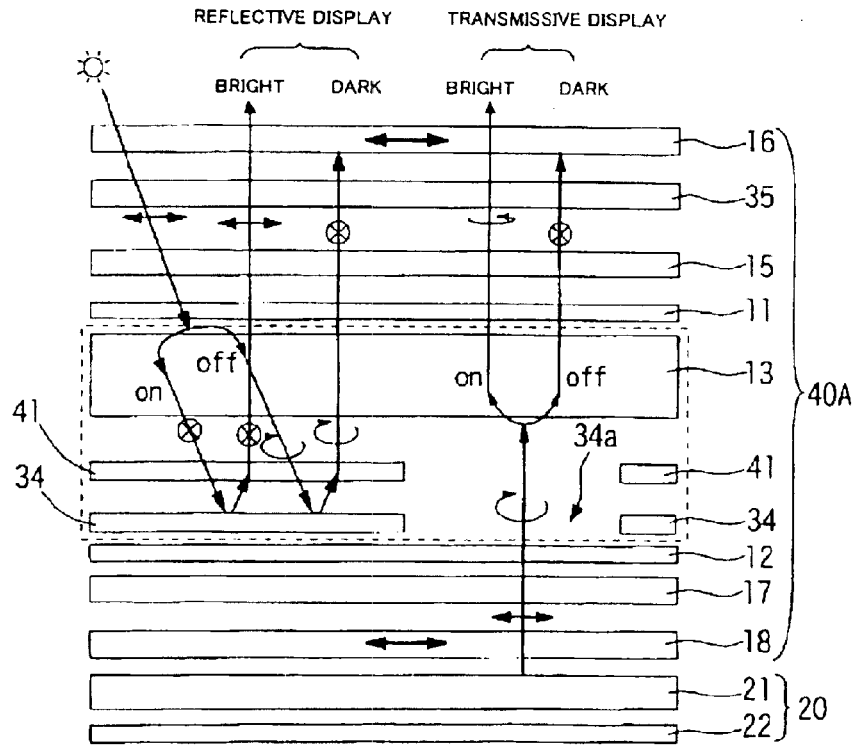
FIG. 6 illustrates the structure of a liquid crystal display device of a sixth embodiment of the present invention in cross section and display principles thereof.

Next, a description of a sixth embodiment of the present invention will be given with reference to FIG. 6. A liquid crystal display device shown in FIG. 6 is a transflective liquid crystal display device having a liquid crystal panel 40A and a backlight (illuminating device) 20, disposed at the back side (bottom side in FIG. 6) of the liquid crystal panel 40A.

In the liquid crystal panel 40A, a liquid crystal layer 13 is sandwiched between opposing upper and lower substrates 11 and 12, an upper retardation film 15, a temperature compensation retardation film (upper retardation film) 35, and an upper polarizer 16 are stacked in that order upon the outer surface of the upper substrate 11, and a lower retardation film 17 and a lower polarizer 18 are stacked upon the outer surface of the lower substrate 12. At the liquid-crystal-layer-13 side of the lower substrate 12, a reflective layer 34 is formed partly within a dot area, and a front-transmission, rear-diffraction layer (an anisotropic optical layer) 41 is disposed above a plane area of the reflective layer 34. At the liquid-crystal-layer-13 side of the upper substrate 11 and the lower substrate 12, although not shown, electrodes and alignment layers for controlling the alignment state of the liquid crystal layer 13 are formed. In some cases, a coloring layer for a color display may be provided. As shown in FIG. 6, the reflective layer 34 is formed partly within a dot area of the liquid crystal panel 40A. Light from the backlight 20 is transmitted through a transmission area 34a where the reflective layer 34 is not formed in order to perform transmissive display. The backlight 20 has the same structure as that shown in FIG. 4.

The liquid crystal layer 13 of the liquid crystal panel used in the present invention comprises STN (super twisted nematic) liquid crystals whose molecules are oriented in a twisted manner at an angle in the range of from 220 to 270 degrees. The product of an optical anisotropy Δn of the liquid crystals and thickness d of the liquid crystal layer 13, that is, Δn·d, lies within the range of from 820 nm to 950 nm.

As in the liquid crystal display device of the fourth embodiment, the Δn·d value of the temperature compensation retardation film 35 is also adjusted so as to fall within the range of Condition (1) in order to make it possible to restrict a reduction in the display quality caused by changes in environmental temperature.

The front-transmission, rear-diffraction layer 41 shown in FIG. 6 has the function of transmitting light incident thereupon from one of the principal surfaces (front surface) without acting upon the incident light in any way and the function of diffracting light incident thereupon from the opposite principal surface (rear surface), and provides, along with the reflective layer 34, a directional reflection function in the liquid crystal display device of the embodiment.

For example, a front-transmission, rear-diffraction member that is disclosed in Japanese Unexamined Patent Application Publication No. 2000-180607 may be used as the front-transmission, rear-diffraction layer 41. The front-transmission, rear-diffraction member that is disclosed in this document diffracts light by a hologram recorded in a film.

In the liquid crystal display device of the embodiment, the front-transmission, rear-diffraction member that is disclosed in this document is used for the front-transmission, rear-diffraction layer 41, and is disposed so that the transmission surface (front surface) of the front-transmission, rear-diffraction layer 41 is disposed adjacent the liquid crystal layer 13. The diffraction angle of the front-transmission, rear-diffraction layer 41 is adjusted so that it is the same as the viewing angle at which a high luminance is obtained in reflective display and an angle defined by a direction perpendicular to the liquid crystal panel 40A.

Next, the principles of display of the liquid crystal display device of the embodiment having the above-described structure will be described. The display principles of the transmissive display shown on the right side in FIG. 6 are the same as those of the transmissive display in the liquid crystal display device of the fourth embodiment, so that only reflective display shown on the left side in FIG. 6 will be described below.

In the reflective display in the liquid crystal display device of the embodiment, light that has obliquely impinged upon the liquid crystal panel 40A from above it is converted-into linearly polarized light that is parallel to the plane of FIG. 6 by the upper polarizer 16 having a polarization axis parallel to the plane of FIG. 6. When the liquid crystal layer 13 is in an on state (that is, in a state in which voltage is applied to the liquid crystals and the liquid crystal molecules are aligned along the electric field), as shown in FIG. 6, the light is converted into linearly polarized light that is perpendicular to the plane of FIG. 6 by polarization conversion action of the upper retardation film 15 and the liquid crystal layer 13. Then, the converted light is incident upon the front-transmission, rear-diffraction layer 41.

In the liquid crystal display device of the embodiment, the front-transmission, rear-diffraction layer 41 transmits the light that is incident upon the liquid-crystal-layer-13-side surface of the front-transmission, rear-diffraction layer 41 without acting upon the light, so that the light impinges upon the reflective layer 34 as it is, is reflected in the specular reflection direction by the reflective layer 34, and impinges upon the front-transmission, rear-diffraction layer 41 from the reflective layer 34. The light is diffracted by the front-transmission, rear-diffraction layer 41 and is made to travel perpendicularly to the liquid crystal panel 40A. Then, after the light has been converted into substantially linearly polarized light that is parallel to the plane of FIG. 6 by the liquid crystal layer 13 and the upper retardation film 15, the converted light impinges upon the upper polarizer 16, and exits therefrom perpendicularly to the liquid crystal panel 40A, so that a bright dot is displayed.

On the other hand, when the liquid crystal layer 13 is in an off state (that is, the orientation state of the liquid crystal molecules is the same as that when voltage is not applied), the light is converted into counterclockwise virtually circularly polarized light by the upper retardation film 15 and the liquid crystal layer 13, and the converted light impinges upon the front-transmission, rear-diffraction layer 41. After the light has been transmitted through the front-transmission, rear-diffraction layer 41, the light reaches the reflective layer 34, is reflected thereby, and is converted into clockwise circularly polarized light. Then, the light impinges upon the front-transmission, rear-diffraction layer 41 again and is diffracted. The light is made to travel perpendicularly to the liquid crystal panel 40A and impinges upon the liquid crystal layer 13. Then, the light is converted into linearly polarized light that is perpendicular to the plane of FIG. 6 by the liquid crystal layer 13 and the upper retardation film 15, and is absorbed by the upper polarizer 16 having a polarization axis that is parallel to the plane of FIG. 6, so that a dark dot is displayed.

In the liquid crystal display device of the embodiment performing a reflective display and a transmissive display based on the aforementioned display principles, as shown in FIG. 6, in the transmissive display, light that is incident upon the upper polarizer 16 from the liquid crystal layer 13 is elliptically polarized light, so that, compared to the related liquid crystal display device 100 shown in FIG. 10, the quantity of light passing through the upper polarizer 16 can be increased, so that a bright transmissive display can be achieved.

By the directional reflection functions that are provided by the front-transmission, rear-diffraction layer 41 and the reflective layer 34, the problems of low contrast and tone reversal in reflective display in the liquid crystal display device shown in FIG. 8 are overcome, so that a good reflective display is achieved. More specifically, in the liquid crystal display device shown in FIG. 8, the display is brighter at a low viewing angle than in the direction of the front surface of the panel. Therefore, when, as shown in FIG. 6, light that has obliquely impinged upon the liquid crystal panel 40A from above it is diffracted at the reflective-layer-34-side of the liquid crystal layer 13, a path of light exiting in the direction of the front surface of the liquid crystal panel 40A is longer than a path of display light exiting in the direction of the front surface of the liquid crystal display device shown in FIG. 8.

In this way, by making it possible to provide the display luminance that is obtained at a low viewing angle in the liquid crystal display device shown in FIG. 8 in the direction of the front surface of the liquid crystal panel 40A, the liquid crystal display device of the embodiment provides a good reflective display.

By disposing the temperature compensation retardation film 35, even if the Δn·d value of the liquid crystal layer 13 changes with changes in environmental temperature, optical compensation of display light is properly carried out, so that a high quality display is provided over a wide temperature region. Therefore, the liquid crystal display device of the embodiment can provide both good transmissive and reflective displays with high luminance and high contrast.

From the aforementioned viewpoints that it is desirable that, in transmissive display, the ellipticity of light incident upon the upper polarizer 16 from the liquid crystal layer 13 be greater than 0 and equal to or less than 0.5, and that, in transmissive display, light incident upon the liquid crystal layer 13 from the backlight 20 can be elliptically polarized light, the structure may be used in the liquid crystal display device of the embodiment. The liquid crystal display device of the sixth embodiment can provide the same advantages as those of the liquid crystal display device of the fourth embodiment.

In an example, liquid crystal display devices having the structures of the liquid crystal display devices of the first and second embodiments and the structures of the liquid crystal display devices shown in FIGS. 8 and 10, respectively, were formed, and their transmittance and reflection ratios were verified. In the Example, the formed liquid crystal display devices will be called Structural Example 1 (having the structure of the first embodiment), Structural Example 2 (having the structure of the second embodiment), comparative example (having the structure shown in FIG. 8), and related example (having the structure shown in FIG. 10).

Figure 7:
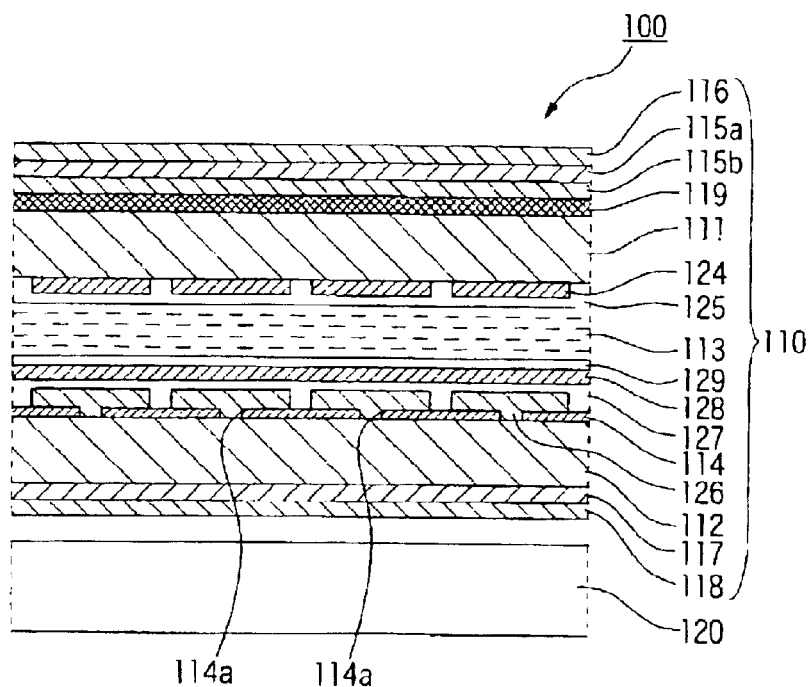
FIG. 7 illustrates the structure of a liquid crystal display device of a comparative example in cross section in Example 1 and display principles thereof.
Figure 12:
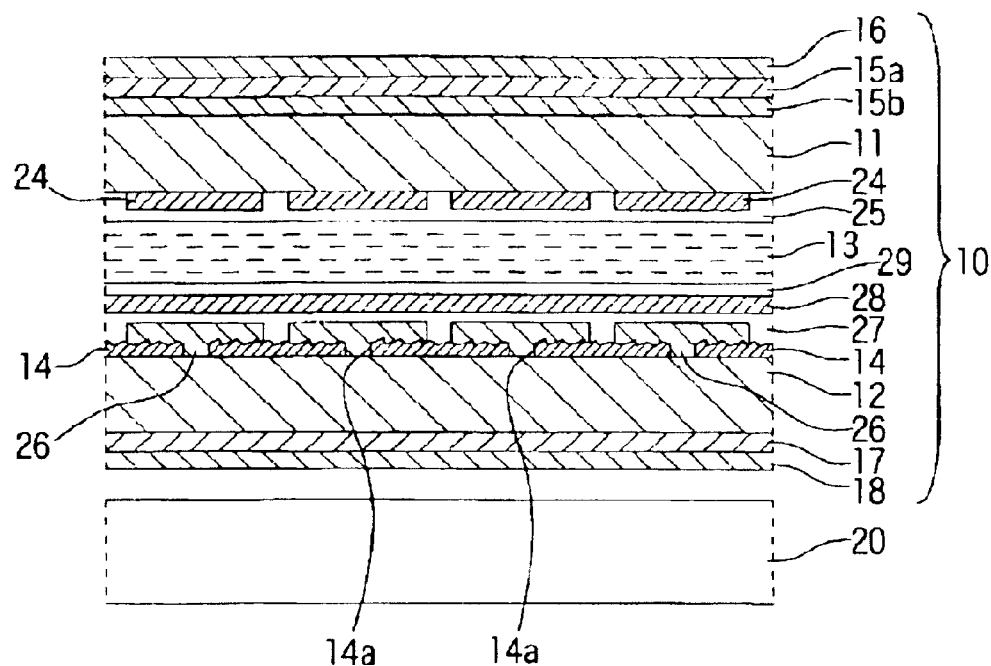
FIG. 12 is a sectional view of the structure of a liquid crystal display device of Structural Example 1 in Example 1.
Figure 13:
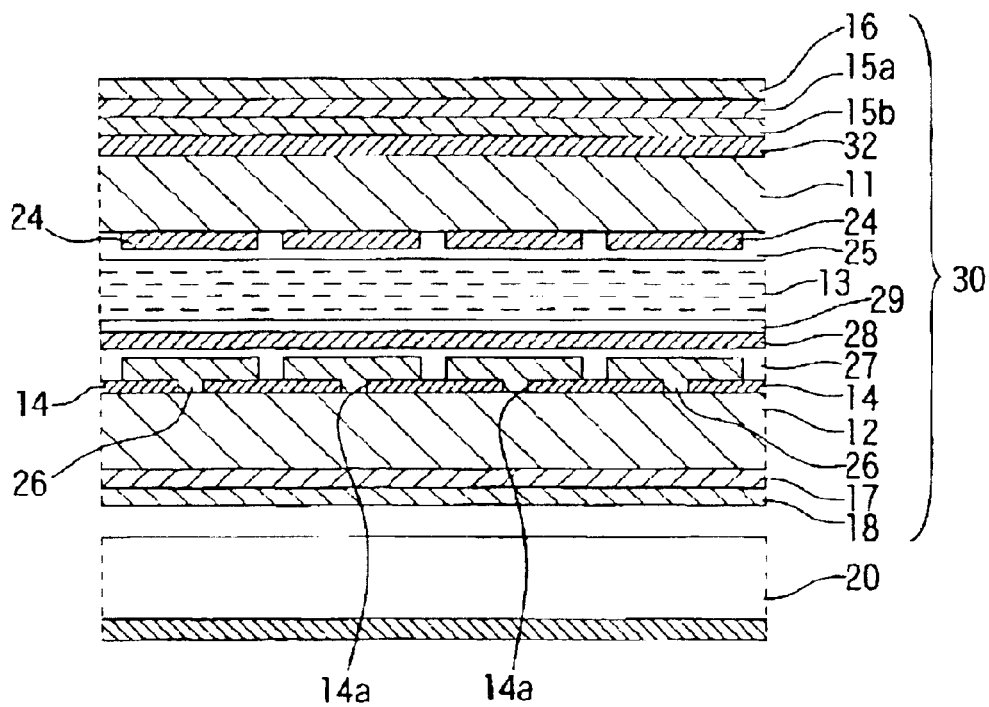
FIG. 13 is a sectional view of the structure of a liquid crystal display device of Structural Example 2 in Example 1.

FIGS. 7, 12, and 13 are sectional views of the structures of the formed liquid crystal display devices in this Example. The structure shown in FIG. 12 corresponds to Structural Example 1, the structure shown in FIG. 13 corresponds to Structural Example 2, and the structure shown in FIG. 7 corresponds to the comparative example and the related example.

The liquid crystal display device of Structural Example 1 shown in FIG. 12 principally includes a liquid crystal panel 10 and a backlight 20. The liquid crystal panel 10 includes an upper substrate 11 and a lower substrate 12, which are transparent glass substrates, and a liquid crystal layer 13, which is formed of STN liquid crystals and is interposed between these substrates 11 and 12. A second upper retardation film 15b, a first upper retardation film 15a, and an upper polarizer 16 are stacked upon the outer surface of the upper substrate 11. A plurality of ITO (indium tin oxide) electrodes 24, which have the shapes of stripes in plan view and which extend perpendicularly to the plane of FIG. 12, and an alignment layer 25, which covers the ITO electrodes 24, are formed on the inner surface of the upper substrate 11. A ¼ wavelength plate (lower retardation film) 17 and a lower polarizer 18 are stacked on the outer surface of the lower substrate 12. A sloping reflective layer 14 having an opening 14a, a plurality of color filters (coloring layers) 26, which are formed in correspondence with dot areas of the liquid crystal panel 10, an overcoat layer 27, which is formed of acrylic resin and which covers these color filters 26, a plurality of ITO electrodes 28, which have the shapes of stripes in plan view and which extend parallel to the plane of FIG. 12, and an alignment layer 29, which covers the ITO electrodes 28, are formed on the inner surface of the lower substrate 12. The backlight 20 comprises a light source (not shown), which can include a white LED and which is disposed at an end surface of a light guide plate 21.

The sloping reflective layer 14 may have, for example, the structure shown in FIG. 11A or the structure shown in FIG. 11B. More specifically, the sloping reflective layer 14 comprises a reflective film 14c, formed of a metal such as Al, that is disposed on a bumpy resinous film 14d having a plurality of triangular prismatic protrusions 14b disposed in a tilted manner within a plane. By the surface shape of the reflective metallic film 14c serving as a reflective surface, light that has obliquely impinged upon the sloping reflective layer 14 is scattered, and is caused to travel mainly perpendicularly to the liquid crystal panel 10.

The liquid crystal display device of Structural Example 2 shown in FIG. 13 primarily includes a liquid crystal panel 30 and a backlight 20. In the liquid crystal panel 30, a reflective layer 34 including a reflective metallic film with a flat surface is formed instead of the sloping reflective layer 14 of the liquid crystal panel 10 of Structural Example 1, and an off-axis anisotropic light scattering layer 32 is disposed between the upper substrate 11 and the second upper retardation film 15b. The backlight 20 has the same structure as that shown in FIG. 12.

The off-axis anisotropic light scattering layer 32 scatters light incident thereupon from the liquid crystal layer 13 at an incident angle of 25 degrees, and causes the light to travel mainly perpendicularly to the liquid crystal panel 30.

The liquid crystal display device shown in FIG. 7 principally includes a liquid crystal panel 110 and a backlight 120. The liquid crystal panel 110 has an upper substrate 111 and a lower substrate 112, which are transparent glass substrates, and a liquid crystal layer 113, which is formed of STN liquid crystals and is interposed between these substrates 111 and 112. An isotropic scattering film 119, a second upper retardation film 115b, a first upper retardation film 115a, and an upper polarizer 116 are stacked upon the outer surface of the upper substrate 111. A plurality of ITO (indium tin oxide) electrodes 124, which have the shapes of stripes in plan view and which extend perpendicularly to the plane of FIG. 7, and an alignment layer 125, which covers the ITO electrodes 124, are formed on the inner surface of the upper substrate 111. A ¼ wavelength plate (lower retardation film) 117 and a lower polarizer 118 are stacked on the outer surface of the lower substrate 112. A sloping reflective layer 114 with an opening 114a, a plurality of color filters (coloring layers) 126, which are formed in correspondence with dot areas of the liquid crystal panel 110, an overcoat layer 127, which is formed of acrylic resin and which covers these color filters 126, a plurality of ITO electrodes 128, which have the shapes of stripes in plan view and which extend parallel to the plane of FIG. 7, and an alignment layer 129, which covers the ITO electrodes 128, are formed on the inner surface of the lower substrate 112. The backlight 120 includes a light source (not shown), which has a white LED and which is disposed at an end surface of a light guide plate 121.

The structure shown in FIG. 7 and the structure of the liquid crystal display device shown in FIG. 8 and the structure of the related liquid crystal display device shown in FIG. 10 are common structures. In other words, the liquid crystal display device shown in FIG. 8 may be formed by changing the Δn·d values of the upper retardation films 115a and 115b and the liquid crystal layer 113 of the liquid crystal display device shown in FIG. 10.

Changed parameters of the liquid crystal display devices of Structural Examples 1 and 2, the comparative example, and the related example are given in Table 1. Table 1 gives, from the second row of the first column, Δn·d of the liquid crystal layers 13 and the liquid crystal layers 113; Δn·d (R1) of the first upper retardation films 15a and the retardation films 115a; Δn·d (R2) of the second upper retardation films 15b and the retardation films 115b; angles θ1 formed between the longitudinal direction of liquid crystal molecules in contact with the alignment layers 25 on the respective upper substrates 11 and the alignment layers 125 on the respective upper substrates 111 and the lag axes of the first upper retardation films; angles θ2 formed between the longitudinal direction of the liquid crystal molecules in contact with the alignment layers on the respective upper substrates and lag axes of the second upper retardation films; angles φ formed between the longitudinal direction of the liquid crystal molecules in contact with the alignment layers on the respective upper substrates and polarization axes of the upper polarizers 16 and the upper polarizers 116; ellipticities of polarized backlight light just before it enters the respective liquid crystal layers; and ellipticities of polarized backlight light before it enters the respective upper polarizers at the side of the upper substrates. The twist angle of the liquid crystals is 240 degrees in all of the above-described liquid crystal display devices.

The liquid crystal display devices were operated to measure the transmittance and reflectance ratios. The results are also given in Table 1.

With the backlights 20 and 120 being operated, the transmittance ratios were obtained by measuring luminance in the direction of the front surfaces of the liquid crystal panels. The reflectance ratios were obtained by measuring reflection luminance at the front surfaces of the liquid crystal panels as a result of causing light to obliquely impinge upon the liquid crystal display devices from the front side at an incident angle of 30 degrees.

As shown in Table 1, in the liquid crystal display devices of Structural Examples 1 and 2 having the structure of the present invention, the transmissive display was bright, and that, in reflective display, the luminance at the front surfaces of the liquid crystal panels was high, and the tone was good. In contrast, although the liquid crystal display device of the comparative example provided a brighter transmissive display than the related liquid crystal display device, the reflective display was dark in the direction of the front surface of the liquid crystal panel and had tone reversal.

TABLE 1

| | STRUCTURAL EXAMPLE 1 | STRUCTURAL EXAMPLE 2 | COMPARATIVE EXAMPLE | RELATED EXAMPLE |
|---|---|---|---|---|
| LIQUID CRYSTAL Δn · d(nm) | 860 | 860 | 860 | 790 |
| R1(nm) | 700 | 700 | 700 | 600 |
| R2(nm) | 180 | 180 | 180 | 170 |
| θ1(°) | 165 | 165 | 165 | 165 |
| θ2(°) | 120 | 120 | 120 | 120 |
| φ(°) | 150 | 150 | 150 | 150 |
| ELLIPTICITY JUST BEFORE ENTERING LIQUID CRYSTAL LAYER | 0.95 | 0.95 | 0.95 | 0.95 |
| ELLIPTICITY JUST BEFORE ENTERING UPPER POLARIZER | 0.38 | 0.40 | 0.40 | 0.82 |
| TRANSMITTANCE RATIO (%) | 2.7 | 2.7 | 2.7 | 2.0 |
| APPEARANCE OF TRANSMISSIVE DISPLAY | BRIGHT | BRIGHT | BRIGHT | DARK |
| REFLECTANCE RATIO (%) | 23 | 23 | 10 | 13 |
| APPEARANCE OF REFLECTIVE DISPLAY | BRIGHT AT FRONT GOOD TONE | BRIGHT AT FRONT GOOD TONE | DARK AT FRONT THERE IS TONE REVERSAL | DARK AT FRONT GOOD TONE |

Next, a liquid crystal display device of Structural Example 4 having structural features of the liquid crystal display device of Structural Example 1 in Example 1 with the liquid crystals having a Δn·d value of 930 nm and a twist angle of 255 degrees was formed, and the transmittance and reflection ratios were verified using the same measurement method as that of Example 1. Table 2 gives the measured results of the transmittance and reflectance ratios along with the parameters of the structural parts of Structural Example 4.

As shown in Table 2, the liquid crystal display device of Structural Example 4 whose liquid crystals had an $\Delta n \cdot d$ value of 930 nm and a twist angle of 255 degrees provided a brighter transmissive display than the liquid crystal display device of Structural Example 1 of Table 1. The transmissive display is brighter because the ellipticity of polarized light incident upon the upper polarizer 16 at the upper substrate side from the liquid crystal layer 13 becomes small, so that the quantity of light passing through the upper polarizer 16 is increased.

TABLE 2

|  | STRUCTURAL EXAMPLE 4 |
| --- | --- |
| LIQUID CRYSTAL $\Delta n \cdot d$(nm) | 930 |
| R1(nm) | 650 |
| R2(nm) | 180 |
| $\theta 1(°)$ | 60 |
| $\theta 2(°)$ | 170 |
| $\phi(°)$ | 30 |
| ELLIPTICITY JUST BEFORE ENTERING LIQUID CRYSTAL LAYER | 0.95 |
| ELLIPTICITY JUST BEFORE ENTERING UPPER POLARIZER | 0.25 |
| TRANSMITTANCE RATIO (%) | 2.9 |
| APPEARANCE OF TRANSMISSIVE DISPLAY | BRIGHT |
| REFLECTANCE RATIO (%) | 23 |
| APPEARANCE OF REFLECTIVE DISPLAY | BRIGHT AT FRONT GOOD TONE |

Figure 14:
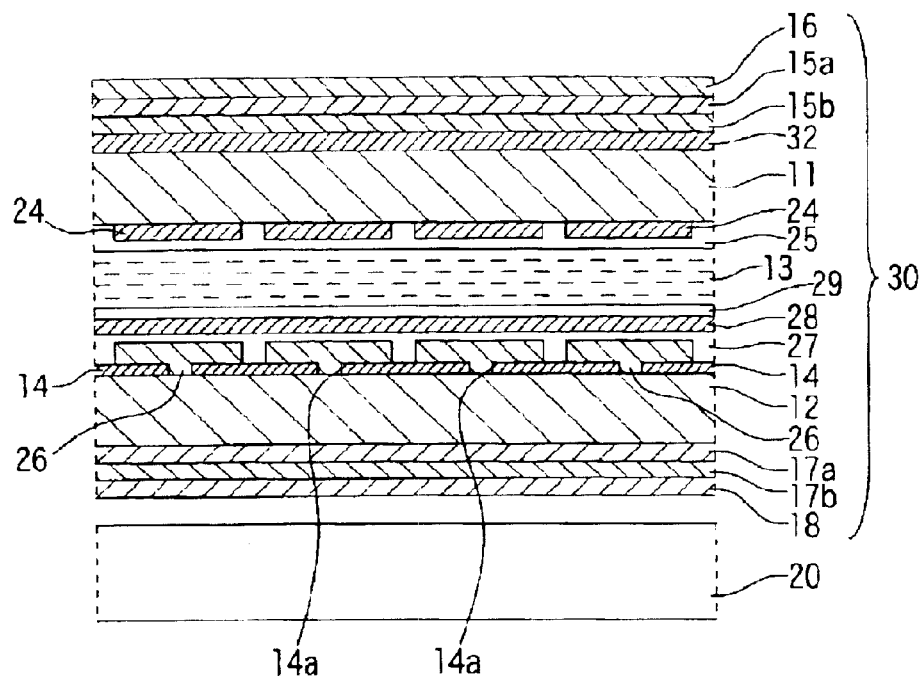
FIG. 14 is a sectional view of the structure of a liquid crystal display device of a related example in Example 1.

Next, liquid crystal display devices of Structural Examples 5 to 7 having the structure of a liquid crystal display device shown in FIG. 14 were formed. The liquid crystal display devices each have structural features of the liquid crystal display device of Structural Example 2 in Example 1 with a first lower retardation film 17a and a second lower retardation film 17b being disposed in that order from a lower substrate 12 instead of the lower retardation film 17 on the outer surface of the lower substrate 12. In this Example, three structural examples were provided by changing $\Delta n \cdot d$ of the first and second lower retardation films 17a and 17b. The transmittance and reflectance ratios were verified using the same measurement method as that used in Example 1. Table 3 gives the measured results of the transmittance and reflectance ratios along with the parameters of the structural parts of Structural Example 3.

In Table 3, R3 is $\Delta n \cdot d$ of a first lower retardation film 17a; R4 is $\Delta n \cdot d$ of a second lower retardation film 17b; $\theta 3$ is the angle formed between the longitudinal direction of liquid crystal molecules in contact with an alignment layer 25 on its associated upper substrate 11 and a lag axis of a first lower retardation film 17a; $\theta 4$ is the angle formed between the longitudinal direction of the liquid crystal molecules in contact with an alignment layer 25 on its associated upper substrate 11 and a lag axis of a second lower retardation film; $\phi 1$ is the angle formed between the longitudinal direction of the liquid crystal molecules in contact with an alignment layer 25 on its associated upper substrate 11 and the polarization axis of an upper polarizer 16 at its associated upper substrate side; and $\phi 2$ is the angle formed between the longitudinal direction of the liquid crystal molecules in contact with an alignment layer 25 on its associated upper substrate 11 and the polarization axis of a lower polarizer 18 at its associated lower substrate side.

As shown in Table 3, the liquid crystal display devices of Structural Examples 5 to 7 formed in the Example have transmittance ratios that are greater than that of the liquid crystal display device of Structural Example 2 in Example 1. Therefore, if the ellipticity of polarized backlight-20 light just before it impinges upon a liquid crystal layer 13 lies within the range of from 0.6 to 1.0, a further brighter transmissive display can be provided.

TABLE 3

|  | STRUCTURAL EXAMPLE 5 | STRUCTURAL EXAMPLE 6 | STRUCTURAL EXAMPLE 7 |
| --- | --- | --- | --- |
| LIQUID CRYSTAL $\Delta n \cdot d$(nm) | 860 | 860 | 860 |
| R1(nm) | 700 | 500 | 260 |
| R2(nm) | 180 | 100 | 400 |
| R3(nm) | 100 | 110 | 130 |
| R4(nm) | 210 | 270 | 280 |
| $\theta 1(°)$ | 165 | 90 | 165 |
| $\theta 2(°)$ | 120 | 20 | 105 |
| $\theta 3(°)$ | 70 | 90 | 80 |
| $\theta 4(°)$ | 147 | 155 | 140 |
| $\phi 1(°)$ | 150 | 150 | 90 |
| $\phi 2(°)$ | 155 | 170 | 150 |
| ELLIPTICITY JUST BEFORE ENTERING LIQUID CRYSTAL LAYER | 0.64 | 0.71 | 0.82 |
| ELLIPTICITY JUST BEFORE ENTERING UPPER POLARIZER | 0.30 | 0.18 | 0.05 |

TABLE 3-continued

|  | STRUCTURAL EXAMPLE 5 | STRUCTURAL EXAMPLE 6 | STRUCTURAL EXAMPLE 7 |
|---|---|---|---|
| TRANSMITTANCE RATIO (%) | 3.2 | 3.1 | 2.9 |
| APPEARANCE OF TRANSMISSIVE DISPLAY | BRIGHT | BRIGHT | BRIGHT |
| REFLECTANCE RATIO (%) | 24 | 26 | 30 |
| APPEARANCE OF REFLECTIVE DISPLAY | BRIGHT AT FRONT GOOD TONE | BRIGHT AT FRONT GOOD TONE | BRIGHT AT FRONT GOOD TONE |

Next, a liquid crystal display device of Structural Example 8 having structural features of the liquid crystal display device of Structural Example 1 in Example 1 with the liquid crystals having an Δn·d value of 820 nm and a twist angle of 240 degrees was formed, and the transmittance and reflection ratios were verified using the same measurement method as that of Example 1. Table 4 gives the measured results of the transmittance and reflectance ratios along with the parameters of the structural parts of Structural Example 8.

As shown in Table 4, it was also confirmed that the liquid crystal display device of Structural Example 8 whose liquid crystals had an Δn·d value of 820 nm and a twist angle of 240 degrees provided a bright transmissive display as the liquid crystal display device of Structural Example 1 of Table 1. The transmissive display is brighter because the ellipticity of polarized light incident upon an upper polarizer 16 from a liquid crystal layer 13 becomes small, so that the quantity of light passing through the upper polarizer 16 is increased.

TABLE 4

|  | STRUCTURAL EXAMPLE 8 |
|---|---|
| LIQUID CRYSTAL Δn · d(nm) | 820 |
| R1(nm) | 670 |
| R2(nm) | 180 |
| θ1(°) | 165 |
| θ2(°) | 125 |
| φ(°) | 150 |
| ELLIPTICITY JUST BEFORE ENTERING LIQUID CRYSTAL LAYER | 0.95 |
| ELLIPTICITY JUST BEFORE ENTERING UPPER POLARIZER | 0.45 |
| TRANSMITTANCE RATIO (%) | 2.4 |
| APPEARANCE OF TRANSMISSIVE DISPLAY | BRIGHT |
| REFLECTANCE RATIO (%) | 20 |
| APPEARANCE OF REFLECTIVE DISPLAY | BRIGHT AT FRONT GOOD TONE |

In the Example, with the structure of the fifth embodiment being used as the basic structure, liquid crystal display devices whose temperature compensation retardation films 35 had their characteristics variously changed, and a liquid crystal display device comprising a related optical compensation plate instead of a temperature compensation film 35 were formed, and their display luminance and contrast were verified. Hereunder, in the Example, the formed liquid crystal display devices are called Example Specimens 1 to 5 (structure of fifth embodiment) and comparative specimen (structure including an optical compensation plate).

Figure 15:
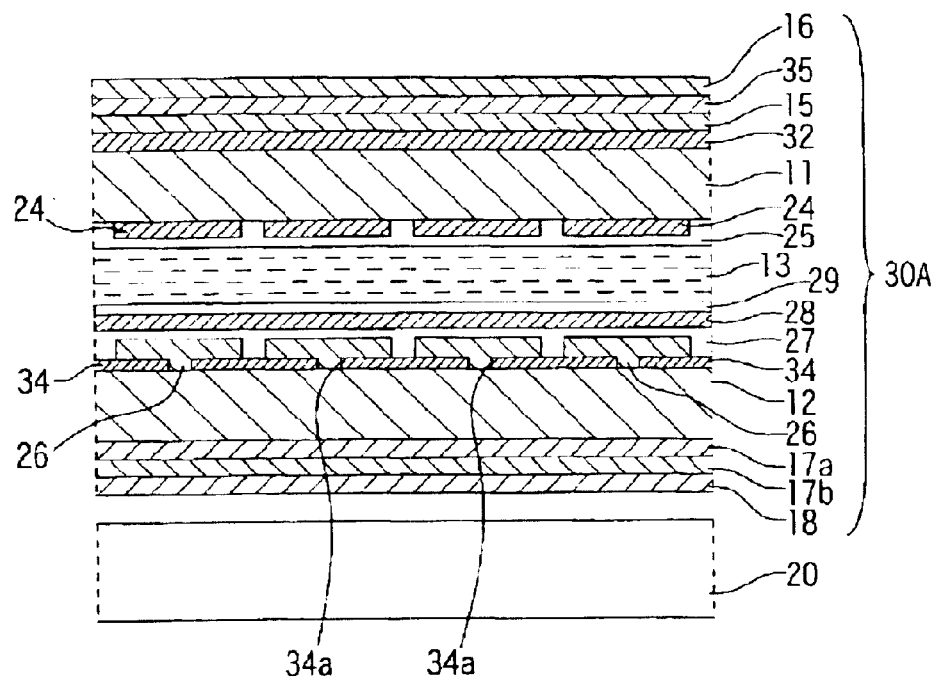
FIG. 15 is a sectional view of the structure of liquid crystal display devices formed in Example 5.

FIG. 15 is a sectional view of the structures of the liquid crystal display devices of Example Specimens 1 to 5. The liquid crystal display device shown in FIG. 15 can include a liquid crystal panel 30A and a backlight 20. The liquid crystal panel 30A has an upper substrate 11 and a lower substrate 12, which are transparent glass substrates, and a liquid crystal layer 13, which is formed of STN liquid crystals and is interposed between these substrates 11 and 12. An off-axis anisotropic light scattering layer 32, a second upper retardation film 15, a temperature compensation retardation film 35, and an upper polarizer 16 are stacked upon the outer surface of the upper substrate 11. A plurality of ITO (indium tin oxide) electrodes 24, which have the shapes of stripes in plan view and which extend perpendicularly to the plane of FIG. 15, and an alignment layer 25, which covers the ITO electrodes 24, are formed on the inner surface of the upper substrate 11. A first lower retardation film 17a, a second lower retardation film 17b, and a lower polarizer 18 are stacked on the outer surface of the lower substrate 12. A reflective layer 34 having an opening (transmission area) 34a, a plurality of color filters (coloring layers) 26, which are formed in correspondence with dot areas of the liquid crystal panel 30A, an overcoat layer 27, which is formed of acrylic resin and which covers these color filters 26, a plurality of ITO electrodes 28, which have the shapes of stripes in plan view and which extend parallel to the plane of FIG. 15, and an alignment layer 29, which covers the ITO electrodes 28, are formed on the inner surface of the lower substrate 12. The backlight 20 includes a light source (not shown), which has a white LED and which is disposed at an end surface of a light guide plate 21. The off-axis anisotropic light scattering layer 32 scatters light incident thereupon from the liquid crystal layer 13 at an incident angle of 25 degrees, and causes the light to travel mainly perpendicularly to the liquid crystal panel 30A.

The liquid crystal display device of the comparative specimen has the same structure as the example specimens except that an optical compensation plate comprising a stretch film is disposed instead of the temperature compensation retardation film 35 shown in FIG. 15.

The parameters of the structural parts of the liquid crystal display devices of Example 5 are given in Table 5. The symbols shown in Table 5 stand for the following:

R1: Δn·d of temperature compensation retardation film 35

R2: Δn·d of upper retardation film 15

R3: Δn·d of first lower retardation film 17a

R4: Δn·d of second lower retardation film 17b

θ1: angle between longitudinal direction of liquid crystal molecules in contact with alignment layer 25 on inner surface of upper substrate and lag axis of temperature compensation retardation film 35

θ2: angle between longitudinal direction of liquid crystal molecules in contact with alignment layer on upper substrate and lag axis of upper retardation film 15

θ3: angle between longitudinal direction of liquid crystal molecules in contact with alignment layer on upper substrate and lag axis of first lower retardation film 17a θ4: angle between longitudinal direction of liquid crystal molecules in contact with alignment film on upper substrate and lag axis of second lower retardation film 17b φ1: angle between longitudinal direction of liquid crystal molecules in contact with alignment layer on upper substrate and polarization axis of upper polarizer 16

φ2: angle between longitudinal direction of liquid crystal molecules in contact with alignment layer on upper substrate and polarization axis of lower polarizer 18

The twist angle of the liquid crystals is 240 degrees for all of the liquid crystal display devices.

Each of the liquid crystal display devices was operated to measure the transmittance ratios, reflectance ratios, and transmissive/reflective display contrast. The measured results are also given in Table 5. With the backlights 20 being operated, the transmittance ratios were obtained by measuring luminance in the direction of the front surfaces of the liquid crystal panels. The reflectance ratios were obtained by measuring reflection luminance at the front surfaces of the liquid crystal panels as a result of causing light to obliquely impinge upon the liquid crystal display devices from the front side at an incident angle of 30 degrees.

As shown in Table 5, it was confirmed that, compared to the liquid crystal display device of Specimen 1 having an R70/R25 value (that is, the ratio between Δn·d of the temperature compensation retardation film 35 at 70° C. (R70) and Δn·d of the temperature compensation retardation film 35 at 25° C. (R25)) less than 0.7 and the comparative specimen using a related optical compensation plate including a stretch film, the liquid crystal display devices of Example Specimens 2 to 5 whose temperature compensation retardation films 35 had an R70/R25 value in the range of from 0.7 to 0.97 inclusive had a contrast reduction width occurring due to a temperature rise that was small in both reflective display and transmissive display, so that they could maintain their display quality over a wide temperature range. In addition, it was confirmed that, of the liquid crystal display devices of Specimens 2 to 5, the liquid crystal display device Specimens 3 and 4 whose R70/R25 values were within the range of from 0.75 to 0.93 had a particularly small reduction in contrast caused by a temperatures rise, so that they had excellent temperature characteristics.

Here, Δn(T) of the liquid crystals in terms of absolute temperature T(K) is proportional to an order parameter S(T) of the liquid crystals. That is, Δn(T)=a·S(T). Here, the order parameter S(T) of the liquid crystals virtually has a relationship like that of Condition (5) below.

$$S(T) = \left(1 - 0.98\frac{T}{T_{ni}}\right)^{0.22} \quad (5)$$

In Condition (5), Tni represents an N-I point (K) of the liquid crystals.

Using the Condition, when Δn of the liquid crystals at 25 and 70° C. are Δn25 and Δn70, respectively, and the N-I point of the liquid crystals is defined as Tni (° C.), the relationship expressed by Condition (6) can be established.

$$\frac{\Delta n70}{\Delta n25} = \left(\frac{T_{ni} - 63}{T_{ni} - 19}\right)^{0.22} \quad (6)$$

Here, if changes in the retardation of a retardation film with temperature is close to changes in Δn of the liquid crystals with temperature, it is possible to restrict a reduction in display quality with changes in environmental temperature. Therefore, as a standard for obtaining a liquid crystal display device having small changes in display quality with changes in environmental temperature, the inventor set ranges of Conditions 3 and 4 from Condition (6), and made verifications as shown in Table 5. The result is that, as shown in Table 5, if R70/R25 can be adjusted within the range of Condition (3) using the N-I point (Tni) of the liquid crystals used to adjust R70/R25 in a temperature compensation retardation film 35, it is possible to restrict a reduction in display quality with changes in environmental temperature; and, if R70/R25 is adjusted within the range of Condition (4), a high quality display is achieved over an even wider temperature range.

TABLE 5

|  | EXAMPLE SPECIMEN 1 | EXAMPLE SPECIMEN 2 | EXAMPLE SPECIMEN 3 | EXAMPLE SPECIMEN 4 | EXAMPLE SPECIMEN 5 | COMPARATIVE SPECIMEN |
|---|---|---|---|---|---|---|
| $T_{ni}$(° C.) | 95 | 95 | 95 | 95 | 95 | 95 |
| LIQUID CRYSTAL (nm) (25° C.)Δn · d | 860 | 860 | 860 | 860 | 860 | 860 |
| LIQUID CRYSTAL (nm) (70° C.)Δn · d | 710 | 710 | 710 | 710 | 710 | 710 |
| R1(25° C.) (nm) | 720 | 720 | 720 | 720 | 720 | 720 |
| R1(70° C.) (nm) | 490 | 530 | 560 | 620 | 680 | 720 |
| R2 (nm) | 180 | 180 | 180 | 180 | 180 | 180 |
| R3 (nm) | 100 | 100 | 100 | 100 | 100 | 100 |
| R4 (nm) | 210 | 210 | 210 | 210 | 210 | 210 |
| θ1 (°) | 165 | 165 | 165 | 165 | 165 | 165 |

TABLE 5-continued

| | EXAMPLE SPECIMEN 1 | EXAMPLE SPECIMEN 2 | EXAMPLE SPECIMEN 3 | EXAMPLE SPECIMEN 4 | EXAMPLE SPECIMEN 5 | COMPARATIVE SPECIMEN |
|---|---|---|---|---|---|---|
| $\theta 2$ (°) | 120 | 120 | 120 | 120 | 120 | 120 |
| $\theta 3$ (°) | 70 | 70 | 70 | 70 | 70 | 70 |
| $\theta 4$ (°) | 140 | 140 | 140 | 140 | 140 | 140 |
| $\phi 1$ (°) | 145 | 145 | 145 | 145 | 145 | 145 |
| $\phi 2$ (°) | 155 | 155 | 155 | 155 | 155 | 155 |
| $\left(\dfrac{T_{ni}-80}{T_{ni}-20}\right)^{0.22}$ | 0.70 | 0.70 | 0.70 | 0.70 | 0.70 | 0.70 |
| $\left(\dfrac{T_{ni}-75}{T_{ni}-20}\right)^{0.22}$ | 0.75 | 0.75 | 0.75 | 0.75 | 0.75 | 0.75 |
| $\dfrac{R70}{R25}$ | 0.68 | 0.74 | 0.78 | 0.86 | 0.94 | 1.00 |
| $\left(\dfrac{T_{ni}-40}{T_{ni}-20}\right)^{0.22}$ | 0.93 | 0.93 | 0.93 | 0.93 | 0.93 | 0.93 |
| $\left(\dfrac{T_{ni}-30}{T_{ni}-20}\right)^{0.22}$ | 0.97 | 0.97 | 0.97 | 0.97 | 0.97 | 0.97 |
| ELLIPTICITY OF BACKLIGHT LIGHT JUST BEFORE ENTERING LIQUID CRYSTAL LAYER | 0.64 | 0.64 | 0.64 | 0.64 | 0.64 | 0.64 |
| ELLIPTICITY OF BACKLIGHT LIGHT JUST BEFORE ENTERING UPPER POLARIZER (25° C.) | 0.30 | 0.30 | 0.30 | 0.30 | 0.30 | 0.30 |
| TRANSMITTANCE RATIO (%) (25° C.) | 3.2 | 3.2 | 3.2 | 3.2 | 3.2 | 3.2 |
| TRANSMITTANCE RATIO (%) (70° C.) | 1.5 | 1.7 | 2.1 | 2.4 | 2.9 | 3.0 |
| TRANSMISSION CONTRAST (25° C.) | 45 | 45 | 45 | 45 | 45 | 45 |
| TRANSMISSION CONTRAST (70° C.) | 4 | 13 | 15 | 16 | 13 | 8 |
| REFLECTANCE RATIO (%) (25° C.) | 24 | 24 | 24 | 24 | 24 | 24 |
| REFLECTANCE RATIO (%) (70° C.) | 17 | 19 | 21 | 21 | 22 | 23 |
| REFLECTION CONTRAST (25° C.) | 12 | 12 | 12 | 12 | 12 | 12 |
| REFLECTION CONTRAST (70° C.) | 3 | 5 | 7 | 7 | 5 | 1 |

In the Example, using the structure of the fourth embodiment as the basic structure, two specimens in which liquid crystals had an Δn·d value of 930 nm and a twist angle of 255 degrees, and in which the parameters of temperature compensation retardation films 35 were changed were formed.

Figure 16:
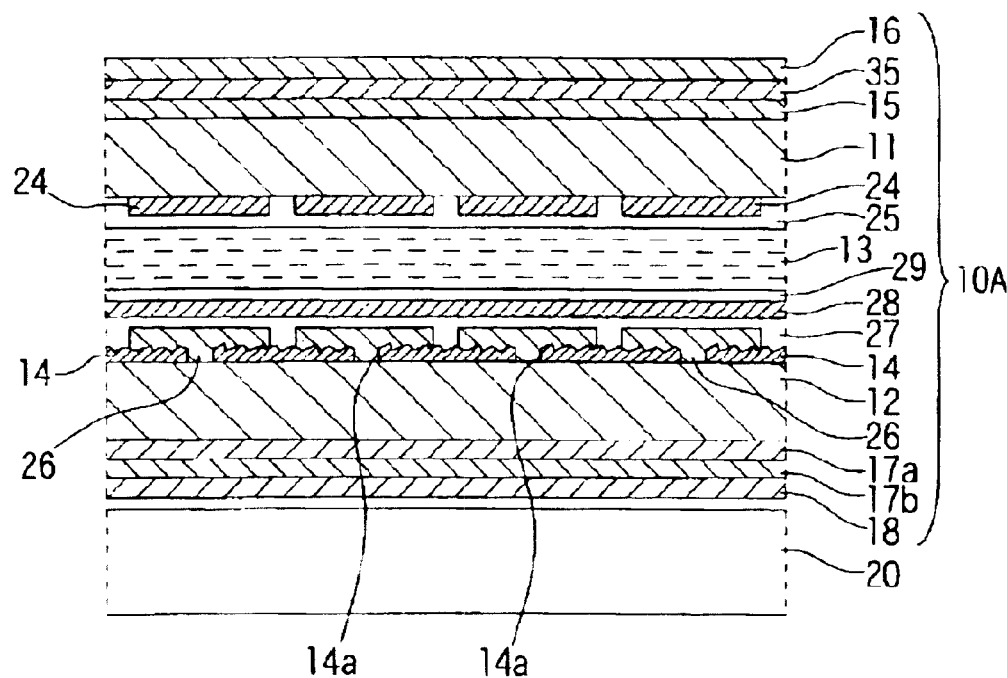
FIG. 16 is a sectional view of the structure of liquid crystal display devices formed in Example 6.

FIG. 16 is a sectional view of the structure of a liquid crystal display devices formed in the Example and having the structure of the fourth embodiment. Each liquid crystal display device principally can include a liquid crystal panel 10A and a backlight 20. The liquid crystal panel 10A has an upper substrate 11 and a lower substrate 12, which are transparent glass substrates, and a liquid crystal layer 13, which is formed of STN liquid crystals and is interposed between these substrates 11 and 12. An upper retardation film 15, a temperature compensation retardation film 35, and an upper polarizer 16 are stacked upon the outer surface of the upper substrate 11. A plurality of ITO (indium tin oxide) electrodes 24, which have the shapes of stripes in plan view and which extend perpendicularly to the plane of FIG. 16, and an alignment layer 25, which covers the ITO electrodes 24, are formed on the inner surface of the upper substrate 11. A first lower retardation film 17a, a second lower retardation film 17b, and a lower polarizer 18 are stacked on the outer surface of the lower substrate 12. A sloping reflective layer 14 having an opening (transmission area) 14a, a plurality of color filters (coloring layers) 26, which are formed in correspondence with dot areas of the liquid crystal panel 10A, an overcoat layer 27, which can be formed of acrylic resin and which covers these color filters 26, a plurality of ITO electrodes 28, which have the shapes of stripes in plan view and which extend parallel to the plane of FIG. 16, and an alignment layer 29, which covers the ITO electrodes 28, are formed on the inner surface of the lower substrate 12. The backlight 20 has a light source (not shown), which include a white LED and which is disposed at an end surface of a light guide plate 21.

The sloping reflective layer 14 may have, for example, the structure shown in FIG. 11A or the structure shown in FIG. 11B. More specifically, the sloping reflective layer 14 includes a reflective film 14c, formed of a metal such as Al, that is disposed on a bumpy resinous film 14d having a plurality of triangular prismatic protrusions 14b disposed in a tilted manner within a plane. By the surface shape of the reflective metallic film 14c serving as a reflective surface, light that has obliquely impinged upon the sloping reflective layer 14 is scattered, and is caused to travel mainly perpendicularly to the liquid crystal panel 10A.

Table 6 gives the measured results of the transmittance and reflective ratios along with the parameters of the structural parts of Example Specimens 6 and 7 formed in the Example. The items shown in Table 6 are the same as those shown in Table 5 of Example 5.

As shown in Table 6, in the liquid crystal display devices of the Example whose liquid crystals had an Δn·d value of 930 nm and a twist angle of 255 degrees, it was possible to even further restrict a reduction in display contrast caused by a rise in environmental temperature than in the liquid crystal display devices of the Example Specimens 2 to 5 in Table 5. This is achieved because the N-I point of the liquid crystals is high at 100° C.

From the results of Examples 5 and 6, even if the parameters of the liquid crystal layers were changed, when the ratio R70/R25, that is, the ratio between Δn·d of each temperature compensation retardation film 35 at 25° C. (R25) and Δn·d of each temperature compensation retardation film 35 at 70° C., was adjusted within the range of Condition (3) or, more desirably, the range of Condition (4) using the N-I point (Tni) of the liquid crystals, it was possible to effectively restrict a reduction in display quality caused by changes in environmental temperature, so that a liquid crystal display device providing a high-quality transmissive/reflective display over a wide temperature range could be achieved.

TABLE 6

|  | EXAMPLE SPECIMEN 4 | EXAMPLE SPECIMEN 5 |
|---|---|---|
| $T_{ni}$(° C.) | 100 | 100 |
| LIQUID CRYSTAL (nm) (25° C.)Δn·d | 930 | 930 |
| LIQUID CRYSTAL (nm) (70° C.)Δn·d | 780 | 780 |
| R1(25° C.) (nm) | 650 | 650 |
| R1(70° C.) (nm) | 550 | 550 |
| R2 (nm) | 180 | 180 |
| R3 (nm) | 140 | 140 |
| R4 (nm) | 0 | 0 |
| θ1 (°) | 60 | 60 |
| θ2 (°) | 170 | 170 |
| θ3 (°) | 120 | 120 |
| θ4 (°) | 0 | 0 |

TABLE 6-continued

|  | EXAMPLE SPECIMEN 4 | EXAMPLE SPECIMEN 5 |
|---|---|---|
| φ1 (°) | 30 | 30 |
| φ2 (°) | 165 | 165 |
| $\left(\frac{T_{ni}-75}{T_{ni}-20}\right)^{0.22}$ | 0.77 | 0.77 |
| $\frac{R70}{R25}$ | 0.85 | 0.92 |
| $\left(\frac{T_{ni}-40}{T_{ni}-20}\right)^{0.22}$ | 0.94 | 0.94 |
| ELLIPTICITY OF BACKLIGHT LIGHT JUST BEFORE ENTERING LIQUID CRYSTAL LAYER | 0.95 | 0.95 |
| ELLIPTICITY OF BACKLIGHT LIGHT JUST BEFORE ENTERING UPPER POLARIZER (25° C.) | 0.25 | 0.25 |
| TRANSMITTANCE RATIO (25° C.) (%) | 2.9 | 2.9 |
| TRANSMITTANCE RATIO (70° C.) (%) | 1.8 | 2.0 |
| TRANSMISSION CONTRAST (25° C.) | 44 | 44 |
| TRANSMISSION CONTRAST (70° C.) | 42 | 45 |
| REFLECTANCE RATIO (25° C.) (%) | 23 | 23 |
| REFLECTANCE RATIO (70° C.) (%) | 19 | 16 |
| REFLECTION CONTRAST (25° C.) | 20 | 20 |
| REFLECTION CONTRAST (70° C.) | 12 | 15 |

Figure 17:
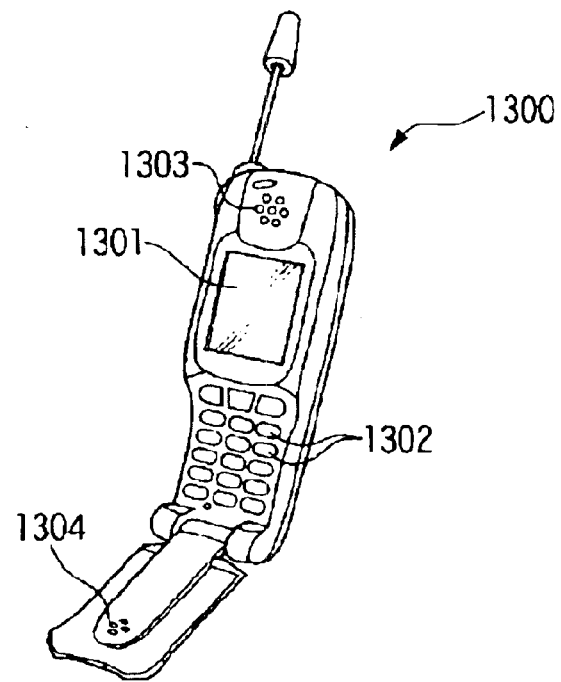
FIG. 17 is a perspective structural view of an example of an electronic device comprising any one of the liquid crystal display devices of the present invention.

FIG. 17 is a perspective view of a cellular phone, which is an example of an electronic device, having any one of the liquid crystal display devices of the present invention disposed at a display section. A cellular phone 1300 can include any one of the liquid crystal display devices of the present invention as a small display section 1301, a plurality of operating buttons 1302, an earpiece 1303, and a mouthpiece 1304.

The liquid crystal display device of any of the embodiments is suitably used as image displaying means in devices, such as an electronic book, a personal computer, a digital still camera, a liquid crystal television, a view-finder or direct-viewing monitoring video tape recorder, a car navigator, a pager, an electronic notebook, an electric calculator, a word processor, a work station, a video telephone, a POS terminal, a touch panel, and the like. All of these electronic devices can provide a high-quality color display.

What is claimed is:

1. A liquid crystal display device, comprising:
   a transflective liquid crystal panel, having:
   opposing first and second substrates,
   a liquid crystal layer disposed between the substrates and having liquid crystal molecules disposed in a twisted manner at an angle in the range of from 220 to 270 degrees,
   a first retardation film and a second retardation film sandwiching the liquid crystal layer from opposite sides of the liquid crystal layer, a first polarizer disposed at a side of the first retardation film that is opposite from a side of the first retardation film that faces the liquid crystal layer, a second polarizer disposed at a side of the second retardation film that is opposite from a side of the second retardation film that faces the liquid crystal layer a transflective layer that is disposed on an inner side of the second substrate and that reflects and transmits a portion of light incident upon the liquid crystal panel; and an illuminating device, wherein, in a pixel in a bright display of the liquid crystal panel, light emitted from the illuminating device and that is incident upon the first polarizer from the liquid crystal layer is elliptically polarized light, and the product of an optical anisotropy Δn and a thickness d of the liquid crystal layer, Δn·d, is in a range of from 820 nm to 950 nm, and the liquid crystal panel having a directional reflection function which causes light obliquely incident upon the liquid crystal panel to exit mainly in a direction perpendicular to the liquid crystal panel rather than in a specular reflection direction.

2. The liquid crystal display device according to claim 1, a ratio R70/R25 being set within a range of Condition (1) using an N-I point, which is represented by Tni (in ° C.) in Condition (1), of liquid crystals of the liquid crystal layer:

$$\left(\frac{T_{ni}-80}{T_{ni}-20}\right)^{0.22} < \frac{R70}{R25} < \left(\frac{T_{ni}-30}{T_{ni}-20}\right)^{0.22} \quad (1)$$

where R70 is the product of an optical anisotropy Δn and a thickness d of the first retardation film, Δn·d, at 70° C., and R25 is that at 25° C.

3. The liquid crystal display device according to claim 2, the ratio R70/R25 being set within a range of Condition (2) using the N-I point, which is represented by Tni (in ° C.) in Condition (2), of the liquid crystals of the liquid crystal layer:

$$\left(\frac{T_{ni}-75}{T_{ni}-20}\right)^{0.22} < \frac{R70}{R25} < \left(\frac{T_{ni}-40}{T_{ni}-20}\right)^{0.22} \quad (2)$$

where R70 is the product of the optical anisotropy Δn and the thickness d of the first retardation film, Δn·d, at 70° C., and R25 is that at 25° C.

4. The liquid crystal display device according to claim 1, wherein, in the pixel in the bright display of the liquid crystal panel, ellipticity of the elliptically polarized light which impinges upon the first polarizer from the liquid crystal layer is greater than 0 and equal to or less than 0.5 at 25° C.

5. The liquid crystal display device according to claim 1, the liquid crystal panel comprising a sloping reflective layer.

6. A liquid crystal display device according to claim 1, the liquid crystal panel comprising an off-axis anisotropic light scattering layer.

7. A liquid crystal display device according to claim 1, the liquid crystal panel comprising an anisotropic optical layer that transmits light that impinges thereupon from a front side of the liquid crystal panel and diffracts light that impinges thereupon from a back side of the liquid crystal panel.

8. A liquid crystal display device according to claim 1, the transflective layer being a reflective layer that is formed partly within a dot area of the liquid crystal panel.

9. A liquid crystal display device according to claim 1, the transflective layer partly reflects and transmits a particular polarized component of incident light or a component of the incident light having a wavelength which lies in a particular wavelength region.

10. An electronic device comprising the liquid crystal display device of claim 1.

* * * * *